US012520843B2

(12) United States Patent
Tobita et al.

(10) Patent No.: US 12,520,843 B2
(45) Date of Patent: Jan. 13, 2026

(54) PLANT DISEASE CONTROL COMPOSITION AND PLANT DISEASE CONTROL METHOD

(71) Applicant: SUMITOMO CHEMICAL COMPANY, LIMITED, Chuo-ku (JP)

(72) Inventors: Hidekatsu Tobita, Takarazuka (JP); Hiroto Tamashima, Takarazuka (JP); Takaaki Nakano, Kasai (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 759 days.

(21) Appl. No.: 17/759,527

(22) PCT Filed: Jan. 29, 2021

(86) PCT No.: PCT/JP2021/003320

§ 371 (c)(1),
(2) Date: Jul. 27, 2022

(87) PCT Pub. No.: WO2021/153758

PCT Pub. Date: Aug. 5, 2021

(65) Prior Publication Data

US 2023/0100754 A1 Mar. 30, 2023

(30) Foreign Application Priority Data

Jan. 31, 2020 (JP) ................................ 2020-015191

(51) Int. Cl.
*A01N 37/38* (2006.01)
*A01N 43/653* (2006.01)
*A01P 3/00* (2006.01)

(52) U.S. Cl.
CPC ........... *A01N 37/38* (2013.01); *A01N 43/653* (2013.01); *A01P 3/00* (2021.08)

(58) Field of Classification Search
CPC ...... A01N 37/38; A01N 43/653; A01N 37/36; A01N 37/50; A01P 3/00; A01P 1/00; A01C 1/06; C07C 69/54; C07C 251/60
See application file for complete search history.

(56) References Cited

U.S. PATENT DOCUMENTS

| | | | | |
|---|---|---|---|---|
| 2005/0101639 | A1 * | 5/2005 | Ammermann | A01N 43/40 514/345 |
| 2021/0307328 | A1 | 10/2021 | Matsuzaki et al. | |

FOREIGN PATENT DOCUMENTS

| | | | | | |
|---|---|---|---|---|---|
| EP | 0460575 | A1 * | 12/1991 | A01N 37/36 |
| EP | 2865265 | A1 * | 4/2015 | A01N 37/52 |
| JP | 11-286472 | A | 10/1999 | |
| JP | 2000-103772 | A | 4/2000 | |
| JP | 2001114737 | A * | 4/2001 | A01N 37/50 |
| WO | WO 98/03464 | A1 | 1/1998 | |
| WO | WO 98/43949 | A1 | 10/1998 | |
| WO | WO 00/18727 | A1 | 4/2000 | |
| WO | WO 00/41999 | A1 | 7/2000 | |
| WO | WO 01/00562 | A1 | 1/2001 | |
| WO | WO-2019166257 | A1 * | 9/2019 | A01N 43/653 |
| WO | WO 2020/027214 | A1 | 2/2020 | |

OTHER PUBLICATIONS

International Search Report issued Apr. 20, 2021, in PCT/JP2021/003320, 3 pages.
International Preliminary Report on Patentability and Written Opinion issued Jul. 28, 2022, in PCT/JP2021/003320, 5 pages.
U.S. Appl. No. 17/759,540, filed Jul. 27, 2022, Hidekatsu Tobita, et al.
U.S. Appl. No. 17/759,530, filed Jul. 27, 2022, Hidekatsu Tobita, et al.

* cited by examiner

*Primary Examiner* — Jeffrey H Murray
*Assistant Examiner* — Kristen W Romero
(74) *Attorney, Agent, or Firm* — Oblon, McClelland, Maier & Neustadt, L.L.P.

(57) ABSTRACT

The present invention provides a composition having excellent control efficacy against plant diseases and a method for controlling plant diseases. A composition for controlling a plant disease comprising a compound represented by formula (I)

(I)

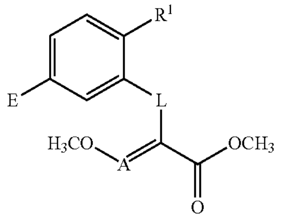

[wherein each symbol represents the same definition as described in the present description] and one or more sterol biosynthetic enzyme inhibitor(s) selected from Group B has excellent control effects on plant diseases; Group B: a group consisting of prothioconazole and mefentrifluconazole.

8 Claims, No Drawings

PLANT DISEASE CONTROL COMPOSITION AND PLANT DISEASE CONTROL METHOD

CROSS-REFERENCE TO RELATED APPLICATIONS

The present application is a 35 U.S.C. § 371 national stage patent application of International patent application PCT/JP2021/003320, filed on Jan. 29, 2021, which is based on and claims the benefits of priority to Japanese Application No. 2020-015191, filed on Jan. 31, 2020. The entire contents of these applications are incorporated herein by reference.

TECHNICAL FIELD

This application claims the priority to and the benefit of Japanese Patent Application No. 2020-015191 filed on Jan. 31, 2020, the entire contents of which are incorporated herein by reference.

The present invention relates to a composition for controlling plant diseases and a method for controlling plant diseases.

BACKGROUND ART

To date, many compounds are known as active ingredients of compositions for controlling plant diseases (for example, see NONPATENT DOCUMENT 1).

CITATION LIST

Nonpatent Document

NONPATENT DOCUMENT 1: The Pesticide Manual 18th-Edition (published by BCPC); ISBN 978-1-9998966-1-4

SUMMARY OF THE INVENTION

Problems to be Solved by the Invention

An object of the present invention is to provide a composition having excellent control efficacy against plant diseases and a method for controlling plant diseases.

MEANS TO SOLVE PROBLEMS

The present inventors have studied to find out a composition having excellent control efficacy against plant diseases and a method for controlling plant diseases. As a result, they have found that a composition comprising the following compound represented by formula (I) and one or more sterol biosynthetic enzyme inhibitor(s) selected from Group B has excellent control efficacy against plant diseases.

Namely, the present invention provides the followings.

[1] A composition for controlling a plant disease comprising a compound represented by formula (I)

(I)

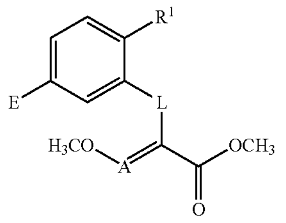

[wherein:

E represents an ethynyl group substituted with a C1-C4 alkyl group, a $R^2ON{=}C(CH_3)—$, or a phenyl group optionally substituted with a halogen atom;

$R^1$ represents a methyl group or a chlorine atom;

$R^2$ represents a C1-C4 alkyl group optionally substituted with a substituent selected from the group consisting of a phenyl group {wherein said phenyl group is optionally substituted with a methyl group} and a cyclopropyl group;

A represents a CH or a nitrogen atom; and

L represents a $CH_2$ or an oxygen atom;

wherein when A represents a nitrogen atom, then L does not represent an oxygen atom]

and one or more sterol biosynthetic enzyme inhibitor(s) selected from Group B:

Group B: a group consisting of prothioconazole and mefentrifluconazole.

[2] The composition for controlling a plant disease according to [1], wherein $R^1$ represents a methyl group;

A represents a CH;

E represents a phenyl group optionally substituted with a fluorine atom or a chlorine atom, a 3,3-dimethyl-1-butyn-1-yl group, or a $R^2ON{=}C(CH_3)—$; and $R^2$ represents a methyl group substituted with a substituent selected from the group consisting of a phenyl group {wherein said phenyl group is optionally substituted with a methyl group} and a cyclopropyl group, or an isopropyl group in the compound represented by formula (I).

[3] The composition for controlling a plant disease according to [1], wherein

L represents a $CH_2$; and

E represents a 3,3-dimethyl-1-butyn-1-yl group in the compound represented by formula (I).

[4] The composition for controlling a plant disease according to [1], wherein the compound represented by formula (I) is methyl (2E)-2-(methoxyimino)-3-[2-methyl-5-(3,3-dimethyl-1-butyn-1-yl)phenyl]propanoate;

methyl (2E)-2-[(2-methyl-5-phenylphenyl)methyl]-3-methoxy-2-propenoate;

methyl (2Z)-2-[2-methyl-5-(2-fluorophenyl)phenoxy]-3-methoxy-2-propenoate;

methyl (2Z)-2-[2-methyl-5-(3,3-dimethyl-1-butyn-1-yl)phenoxy]-3-methoxy-2-propenoate;

methyl (2Z)-2-{2-methyl-5-[(1E)-N-isopropoxyethanimidoyl]phenoxy}-3-methoxy-2-propenoate;

methyl (2Z)-2-{2-methyl-5-[(1E)-N-(benzyloxy)ethanimidoyl]phenoxy}-3-methoxy-2-propenoate;

methyl (2Z)-2-(2-methyl-5-{(1E)-N-[(2-methylphenyl)methoxy]ethanimidoyl}phenoxy)-3-methoxy-2-propenoate;

methyl (2Z)-2-(2-methyl-5-{(1E)-N-[(3-methylphenyl)methoxy]ethanimidoyl}phenoxy)-3-methoxy-2-propenoate;

methyl (2Z)-2-(2-methyl-5-phenylphenoxy)-3-methoxy-2-propenoate;

methyl (2E)-2-{[2-methyl-5-(3-chlorophenyl)phenyl]methyl}-3-methoxy-2-propenoate;

methyl (2Z)-2-[2-methyl-5-(3-chlorophenyl)phenoxy]-3-methoxy-2-propenoate;

methyl (2E)-2-({2-methyl-5-[(1E)-N-isopropoxyethanimidoyl]phenyl}methyl)-3-methoxy-2-propenoate;

methyl (2E)-2-({2-methyl-5-[(1E)-N-(cyclopropylmethoxy)ethanimidoyl]phenyl}methyl)-3-methoxy-2-propenoate;

methyl (2E)-2-({2-methyl-5-[(1E)-N-(2-methylpropoxy)ethanimidoyl]phenyl}methyl)-3-methoxy-2-propenoate;

methyl (2E)-2-{[2-methyl-5-(2-fluorophenyl)phenyl]methyl}-3-methoxy-2-propenoate;

methyl (2Z)-2-[2-chloro-5-(2-fluorophenyl)phenoxy]-3-methoxy-2-propenoate;

methyl (2E)-2-{[2-methyl-5-(3,3-dimethyl-1-butyn-1-yl)phenyl]methyl}-3-methoxy-2-propenoate;

methyl (2Z)-2-[2-chloro-5-(3,3-dimethyl-1-butyn-1-yl)phenoxy]-3-methoxy-2-propenoate; or methyl (2Z)-2-[2-methyl-5-(4-fluorophenyl)phenoxy]-3-methoxy-2-propenoate.

[5] The composition for controlling a plant disease according to any one of [1] to [4], wherein the sterol biosynthetic enzyme inhibitor is prothioconazole.

[6] The composition for controlling a plant disease according to any one of [1] to [4], wherein the sterol biosynthetic enzyme inhibitor is mefentrifluconazole.

[7] The composition for controlling a plant disease according to any one of [1] to [6], wherein the weight ratio of the compound represented by formula (I) to the sterol biosynthetic enzyme inhibitor is within the range of 1:0.01 to 1:100.

[8] The composition for controlling a plant disease according to any one of [1] to [6], wherein the weight ratio of the compound represented by formula (I) to the sterol biosynthetic enzyme inhibitor is within the range of 1:0.1 to 1:10.

[9] A method for controlling a plant disease which comprises applying an effective amount of the composition for controlling a plant disease according to any one of [1] to [8], to a plant or soil for cultivating a plant.

[10] Use of the composition for controlling a plant disease according to any one of [1] to [0] for controlling a plant disease.

Effect of Invention

The composition for controlling plant diseases of the present invention can control plant diseases.

MODE FOR CARRYING OUT THE INVENTION

The composition for controlling plant diseases of the present invention (hereinafter referred to as "Present composition" or "Composition of the present invention") comprises the above compound represented by formula (I) (hereinafter referred to as "Present compound A" or "Compound A of the present invention") and one or more sterol biosynthetic enzyme inhibitor(s) selected from Group B (hereinafter referred to as "Present compound B" or "Compound B of the present invention").

The substituents in the present invention are explained as follows.

The term of "halogen atom" represents a fluorine atom, a chlorine atom, a bromine atom, or an iodine atom.

When a substituent has two or more halogen atoms, these halogen atoms may be identical to or different from each other.

The expression of "CX-CY" as described herein means that the number of carbon atom is X to Y. For example, the expression of "C1-C4" means that the number of carbon atom is 1 to 4.

Examples of the term of "alkyl group" include a methyl group, an ethyl group, a propyl group, an isopropyl group, a butyl group, an isobutyl group, a sec-butyl group, and a tert-butyl group.

The Present compound A may optionally have one or more stereoisomer(s). Examples of the stereoisomer(s) include enantiomers, diastereomers, and geometric isomers. The Present compound A encompasses each stereoisomer and mixtures of stereoisomers at any ratio.

Aspects of the Present compound A include the following compounds.

[Aspect 1] The Present compound A, wherein $R^1$ represents a methyl group.

[Aspect 2] The Present compound A, wherein A represents a CH, and L represents a $CH_2$ or an oxygen atom.

[Aspect 3] The Present compound A, wherein A represents a nitrogen atom, and L represents a $CH_2$.

[Aspect 4] The Present compound A, wherein A represents a CH or a nitrogen atom, and L represents a $CH_2$.

[Aspect 5] The Present compound A, wherein E represents a phenyl group, a 3,3-dimethyl-1-butyn-1-yl group, or a $R^2ON{=}C(CH_3)$—, and $R^2$ represents an isopropyl group or a methyl group {wherein said methyl group is substituted with a phenyl group {wherein said phenyl group is optionally substituted with a methyl group} or a cyclopropyl group}.

[Aspect 6] The Present compound A, wherein E represents a phenyl group optionally substituted with a fluorine atom or a chlorine atom.

[Aspect 7] The Present compound A, wherein E represents a 3,3-dimethyl-1-butyn-1-yl group.

[Aspect 8] The Present compound A, wherein E represents a $R^2ON{=}C(CH_3)$—, and $R^2$ represents an isopropyl group or a methyl group {wherein said methyl group is substituted with a phenyl group {wherein said phenyl group is optionally substituted with a methyl group} or a cyclopropyl group}.

[Aspect 9] The Present compound A, wherein E represents a 2-fluorophenyl group.

[Aspect 10] The compound according to the Aspect 5, wherein $R^1$ represents a methyl group, A represents a CH, and L represents a $CH_2$ or an oxygen atom.

[Aspect 11] The compound according to the Aspect 6, wherein $R^1$ represents a methyl group, A represents a CH, and L represents a $CH_2$ or an oxygen atom.

[Aspect 12] The compound according to the Aspect 7, wherein A represents a CH or a nitrogen atom, and L represents a $CH_2$.

[Aspect 13] The compound according to the Aspect 7, wherein A represents a CH, and L represents a $CH_2$ or an oxygen atom.

[Aspect 14] The compound according to the Aspect 8, wherein $R^1$ represents a methyl group, A represents a CH, and L represents a $CH_2$ or an oxygen atom.

[Aspect 15] The compound according to the Aspect 9, wherein A represents a CH, and L represents a $CH_2$ or an oxygen atom.

[Aspect 16] The compound according to the Aspect 1, wherein A represents a CH, and L represents a $CH_2$ or an oxygen atom.

[Aspect 17] The compound according to the Aspect 1, wherein A represents a nitrogen atom, and L represents a $CH_2$.

[Aspect 18] The compound according to the Aspect 1, wherein A represents a CH or a nitrogen atom, and L represents a $CH_2$.

Aspects of the Present composition include the following compositions.

[Aspect 19] A composition wherein the weight ratio of the compound represented by formula (I) according to the above [2] to the Present compound B is within the range of 1:0.01 to 1:100.

[Aspect 20] A composition wherein the weight ratio of the compound represented by formula (I) according to the above [3] to the Present compound B is within the range of 1:0.01 to 1:100.

[Aspect 21] A composition wherein the weight ratio of the compound represented by formula (I) according to the above [4] to the Present compound B is within the range of 1:0.01 to 1:100.

[Aspect 22] A composition wherein the weight ratio of the compound according to the Aspect 5 to the Present compound B is within the range of 1:0.01 to 1:100.

[Aspect 23] A composition wherein the weight ratio of the compound according to the Aspect 6 to the Present compound B is within the range of 1:0.01 to 1:100.

[Aspect 24] A composition wherein the weight ratio of the compound according to the Aspect 7 to the Present compound B is within the range of 1:0.01 to 1:100.

[Aspect 25] A composition wherein the weight ratio of the compound according to the Aspect 8 to the Present compound B is within the range of 1:0.01 to 1:100.

[Aspect 26] A composition wherein the weight ratio of the compound according to the Aspect 9 to the Present compound B is within the range of 1:0.01 to 1:100.

[Aspect 27] A composition wherein the weight ratio of the compound according to the Aspect 10 to the Present compound B is within the range of 1:0.01 to 1:100.

[Aspect 28] A composition wherein the weight ratio of the compound according to the Aspect 11 to the Present compound B is within the range of 1:0.01 to 1:100.

[Aspect 29] A composition wherein the weight ratio of the compound according to the Aspect 12 to the Present compound B is within the range of 1:0.01 to 1:100.

[Aspect 30] A composition wherein the weight ratio of the compound according to the Aspect 13 to the Present compound B is within the range of 1:0.01 to 1:100.

[Aspect 31] A composition wherein the weight ratio of the compound according to the Aspect 14 to the Present compound B is within the range of 1:0.01 to 1:100.

[Aspect 32] A composition wherein the weight ratio of the compound according to the Aspect 15 to the Present compound B is within the range of 1:0.01 to 1:100.

[Aspect 33] A composition wherein the weight ratio of the compound represented by formula (I) according to the above [2] to the Present compound B is within the range of 1:0.1 to 1:10.

[Aspect 34] A composition wherein the weight ratio of the compound represented by formula (I) according to the above [3] to the Present compound B is within the range of 1:0.1 to 1:10.

[Aspect 35] A composition wherein the weight ratio of the compound represented by formula (I) according to the above [4] to the Present compound B is within the range of 1:0.1 to 1:10.

[Aspect 36] A composition wherein the weight ratio of the compound according to the Aspect 5 to the Present compound B is within the range of 1:0.1 to 1:10.

[Aspect 37] A composition wherein the weight ratio of the compound according to the Aspect 6 to the Present compound B is within the range of 1:0.1 to 1:10.

[Aspect 38] A composition wherein the weight ratio of the compound according to the Aspect 7 to the Present compound B is within the range of 1:0.1 to 1:10.

[Aspect 39] A composition wherein the weight ratio of the compound according to the Aspect 8 to the Present compound B is within the range of 1:0.1 to 1:10.

[Aspect 40] A composition wherein the weight ratio of the compound according to the Aspect 9 to the Present compound B is within the range of 1:0.1 to 1:10.

[Aspect 41] A composition wherein the weight ratio of the compound according to the Aspect 10 to the Present compound B is within the range of 1:0.1 to 1:10.

[Aspect 42] A composition wherein the weight ratio of the compound according to the Aspect 11 to the Present compound B is within the range of 1:0.1 to 1:10.

[Aspect 43] A composition wherein the weight ratio of the compound according to the Aspect 12 to the Present compound B is within the range of 1:0.1 to 1:10.

[Aspect 44] A composition wherein the weight ratio of the compound according to the Aspect 13 to the Present compound B is within the range of 1:0.1 to 1:10.

[Aspect 45] A composition wherein the weight ratio of the compound according to the Aspect 14 to the Present compound B is within the range of 1:0.1 to 1:10.

[Aspect 46] A composition wherein the weight ratio of the compound according to the Aspect 15 to the Present compound B is within the range of 1:0.1 to 1:10.

[Aspect 47] A composition wherein the weight ratio of the compound represented by formula (I) according to the above [2] to prothioconazole is within the range of 1:0.01 to 1:100.

[Aspect 48] A composition wherein the weight ratio of the compound represented by formula (I) according to the above [2] to mefentrifluconazole is within the range of 1:0.01 to 1:100.

[Aspect 49] A composition wherein the weight ratio of the compound represented by formula (I) according to the above [2] to prothioconazole is within the range of 1:0.1 to 1:10.

[Aspect 50] A composition wherein the weight ratio of the compound represented by formula (I) according to the above [2] to mefentrifluconazole is within the range of 1:0.1 to 1:10.

[Aspect 51] A composition wherein the weight ratio of the compound represented by formula (I) according to the above [3] to prothioconazole is within the range of 1:0.01 to 1:100.

[Aspect 52] A composition wherein the weight ratio of the compound represented by formula (I) according to the above [3] to mefentrifluconazole is within the range of 1:0.01 to 1:100.

[Aspect 53] A composition wherein the weight ratio of the compound represented by formula (I) according to the above [3] to prothioconazole is within the range of 1:0.1 to 1:10.

[Aspect 54] A composition wherein the weight ratio of the compound represented by formula (I) according to the above [3] to mefentrifluconazole is within the range of 1:0.1 to 1:10.

[Aspect 55] A composition wherein the weight ratio of the compound represented by formula (I) according to the above [4] to prothioconazole is within the range of 1:0.01 to 1:100.

[Aspect 56] A composition wherein the weight ratio of the compound represented by formula (I) according to the above [4] to mefentrifluconazole is within the range of 1:0.01 to 1:100.

[Aspect 57] A composition wherein the weight ratio of the compound represented by formula (I) according to the above [4] to prothioconazole is within the range of 1:0.1 to 1:10.

[Aspect 58] A composition wherein the weight ratio of the compound represented by formula (I) according to the above [4] to mefentrifluconazole is within the range of 1:0.1 to 1:10.

[Aspect 59] A composition wherein the weight ratio of the compound according to the Aspect 5 to prothioconazole is within the range of 1:0.01 to 1:100.

[Aspect 60] A composition wherein the weight ratio of the compound according to the Aspect 5 to mefentrifluconazole is within the range of 1:0.01 to 1:100.

[Aspect 61] A composition wherein the weight ratio of the compound according to the Aspect 5 to prothioconazole is within the range of 1:0.1 to 1:10.

[Aspect 62] A composition wherein the weight ratio of the compound according to the Aspect 5 to mefentrifluconazole is within the range of 1:0.1 to 1:10.

[Aspect 63] A composition wherein the weight ratio of the compound according to the Aspect 6 to prothioconazole is within the range of 1:0.01 to 1:100.

[Aspect 64] A composition wherein the weight ratio of the compound according to the Aspect 6 to mefentrifluconazole is within the range of 1:0.01 to 1:100.

[Aspect 65] A composition wherein the weight ratio of the compound according to the Aspect 6 to prothioconazole is within the range of 1:0.1 to 1:10.

[Aspect 66] A composition wherein the weight ratio of the compound according to the Aspect 6 to mefentrifluconazole is within the range of 1:0.1 to 1:10.

[Aspect 67] A composition wherein the weight ratio of the compound according to the Aspect 7 to prothioconazole is within the range of 1:0.01 to 1:100.

[Aspect 68] A composition wherein the weight ratio of the compound according to the Aspect 7 to mefentrifluconazole is within the range of 1:0.01 to 1:100.

[Aspect 69] A composition wherein the weight ratio of the compound according to the Aspect 7 to prothioconazole is within the range of 1:0.1 to 1:10.

[Aspect 70] A composition wherein the weight ratio of the compound according to the Aspect 7 to mefentrifluconazole is within the range of 1:0.1 to 1:10.

[Aspect 71] A composition wherein the weight ratio of the compound according to the Aspect 8 to prothioconazole is within the range of 1:0.01 to 1:100.

[Aspect 72] A composition wherein the weight ratio of the compound according to the Aspect 8 to mefentrifluconazole is within the range of 1:0.01 to 1:100.

[Aspect 73] A composition wherein the weight ratio of the compound according to the Aspect 8 to prothioconazole is within the range of 1:0.1 to 1:10.

[Aspect 74] A composition wherein the weight ratio of the compound according to the Aspect 8 to mefentrifluconazole is within the range of 1:0.1 to 1:10.

[Aspect 75] A composition wherein the weight ratio of the compound according to the Aspect 9 to prothioconazole is within the range of 1:0.01 to 1:100.

[Aspect 76] A composition wherein the weight ratio of the compound according to the Aspect 9 to mefentrifluconazole is within the range of 1:0.01 to 1:100.

[Aspect 77] A composition wherein the weight ratio of the compound according to the Aspect 9 to prothioconazole is within the range of 1:0.1 to 1:10.

[Aspect 78] A composition wherein the weight ratio of the compound according to the Aspect 9 to mefentrifluconazole is within the range of 1:0.1 to 1:10.

Next, methods for producing the Present compound A are described.

The Present compound A may be produced according to the methods described in WO 2000/041999 pamphlet, WO 1998/003464 pamphlet, WO 2001/000562 pamphlet, WO 1998/043949 pamphlet, or the like. Further, the Present compound A may also be produced according to the following Production methods.

Production Method A

A compound represented by formula (A1) (hereinafter referred to as "Compound (A1)") may be produced by reacting a compound represented by formula (B1) (hereinafter referred to as "Compound (B1)") with a compound represented by formula (M1) (hereinafter referred to as "Compound (M1)") in the presence of a palladium catalyst and a base.

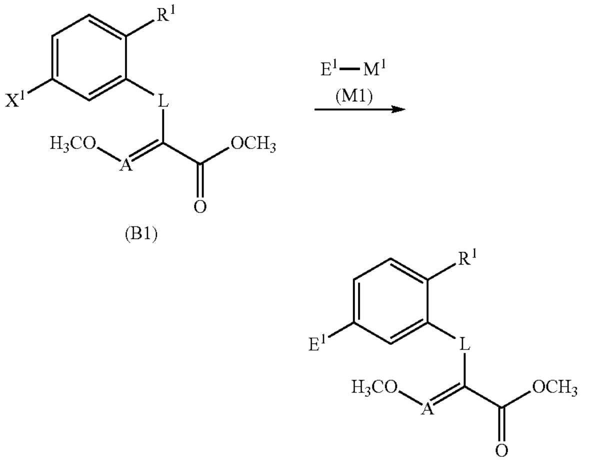

(B1)

(A1)

[wherein $E^1$ represents a phenyl group optionally substituted with a halogen atom; $M^1$ represents a $B(OH)_2$ or a 4,4,5,5-tetramethyl-1,3,2-dioxaborolan-2-yl group; $X^1$ represents a leaving group such as a chlorine atom, a bromine atom, an iodine atom, and a triflyloxy group; and the other symbols are the same as defined above.]

The reaction is usually carried out in a solvent. Examples of the solvent to be used in the reaction include hydrocarbons such as hexane, toluene, and xylene (hereinafter collectively referred to as "hydrocarbons"); ethers such as methyl tert-butyl ether (hereinafter referred to as "MTBE"), tetrahydrofuran (hereinafter referred to as "THF"), and dimethoxyethane (hereinafter collectively referred to as "ethers"); halogenated hydrocarbons such as chloroform and chlorobenzene (hereinafter collectively referred to as "halogenated hydrocarbons"); amides such as dimethylformamide (hereinafter referred to as "DMF") and N-methylpyrrolidone (hereinafter collectively referred to as "amides"); esters such as methyl acetate and ethyl acetate (hereinafter collectively referred to as "esters"); nitriles such as acetonitrile and propionitrile (hereinafter collectively referred to as "nitriles"); water; and mixtures of two or more of them.

Examples of the palladium catalyst to be used in the reaction include {1,1'-bis(diphenylphosphino)ferrocene}palladium(II) dichloride.

Examples of the base to be used in the reaction include organic bases such as triethylamine and pyridine (hereinafter collectively referred to as "organic bases"); alkali metal carbonates such as sodium carbonate and potassium carbonate; alkali metal hydrogen carbonates such as sodium hydrogen carbonate and potassium hydrogen carbonate; sodium fluoride; and tripotassium phosphate.

In the reaction, the Compound (M1) is usually used at a ratio of 1 to 10 mol, the palladium catalyst is usually used at a ratio of 0.01 to 1 mol, and the base is usually used at a ratio of 1 to 10 mol, relative to 1 mol of the Compound (B1).

The reaction temperature is usually within the range of 0 to 150° C. The reaction time is usually within the range of 0.1 to 120 hour(s).

When the reaction is completed, the reaction mixture may be subjected to a work-up such as concentration and drying to isolate the Compound (A1).

The Compound (B1) and the Compound (M1) are known compounds or may be produced according to known method(s).

Production Method B

A compound represented by formula (A2) (hereinafter referred to as "Compound (A2)") may be produced by reacting the Compound (B1) with a compound represented by formula (M2) (hereinafter referred to as "Compound (M2)") in the presence of a metal catalyst and a base.

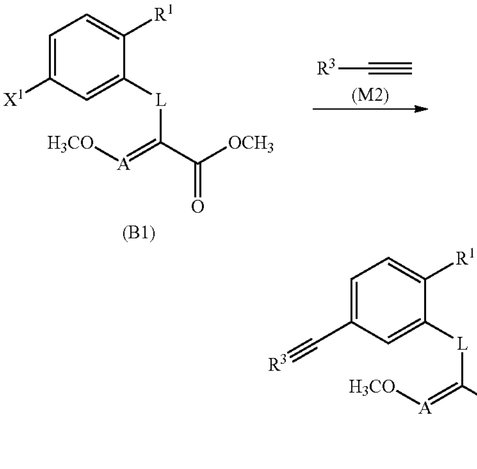

(B1)

(A2)

[wherein $R^3$ represents a C1-C4 alkyl group; and the other symbols are the same as defined above.]

The reaction is usually carried out in a solvent. Examples of the solvent to be used in the reaction include hydrocarbons, ethers, halogenated hydrocarbons, amides, esters, nitriles, and mixtures of two or more of them.

Examples of the metal catalyst to be used in the reaction include bis(triphenylphosphine)palladium(II) dichloride (hereinafter referred to as "$PdCl_2$ $(PPh_3)_2$") and copper(I) iodide.

Examples of the base to be used in the reaction include organic bases.

In the reaction, the Compound (M2) is usually used at a ratio of 1 to 10 mol, the metal catalyst is usually used at a ratio of 0.01 to 1 mol, and the base is usually used at a ratio of 1 to 10 mol, relative to 1 mol of the Compound (B1).

The reaction temperature is usually within the range of 0 to 150° C. The reaction time is usually within the range of 0.1 to 120 hour(s).

When the reaction is completed, the reaction mixture may be subjected to a work-up such as concentration and drying to isolate the Compound (A2).

The Compound (B1) and the Compound (M2) are known compounds or may be produced according to known method(s).

Production Method C

A compound represented by formula (A3) (hereinafter referred to as "Compound (A3)") may be produced by reacting a compound represented by formula (B2) (hereinafter referred to as "Compound (B2)") with a compound represented by formula (M3) (hereinafter referred to as "Compound (M3)") or a salt thereof.

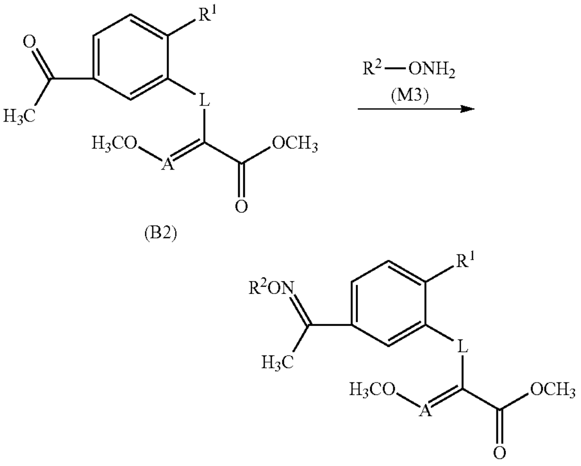

(B2)

(A3)

[wherein the symbols are the same as defined above.]

Examples of the salt of the Compound (M3) include hydrochloride and sulfate.

The reaction may be carried out according to the methods described in WO 1998/043949 pamphlet, WO 2000/041999 pamphlet, WO 2000/007999 pamphlet, or the like.

The Compound (B2) and the Compound (M3) are known compounds or may be produced according to known method(s).

The Present compound B includes one or more compound(s) selected from the group consisting of prothioconazole and mefentrifluconazole.

Prothioconazole and mefentrifluconazole to be used in the present invention are all known compounds, and described in, for example, pages 966 and 728 of "The Pesticide Manual 18th-Edition (published by BCPC); ISBN 978-1-9998966-1-4". These compounds may be obtained from commercially available formulations, or produced according to known methods.

In the Present composition, the weight ratio of the Present compound A to the Present compound B is usually within the range of 1:0.01 to 1:100, preferably 1:0.1 to 1:10, more preferably 1:0.2 to 1:5, and still more preferably 1:0.3 to 1:3.

While the composition for controlling plant diseases of the present invention may be prepared by just mixing the Present compound A and the Present compound B, the Present composition is usually prepared by mixing the Present compound A and the Present compound B with solid carrier(s), liquid carrier(s), oil(s), surfactant(s), and/or the like, and as needed, adding other auxiliary agent(s) for formulation, to formulate into an emulsifiable concentrate, an oil solution, a dust formulation, a granule, a wettable powder, a granular wettable powder, a flowable, a dry flowable, a microcapsule, or the like to be used. The total amount of the Present compound A and the Present compound B in these formulations is usually within the range of 0.1 to 100% by weight, preferably 0.2 to 90% by weight, and more preferably 1 to 80% by weight.

Examples of the solid carrier(s) include fine powders and granules of clays (for example, kaolin clay, diatomaceous earth, bentonite, and acid white clay), dry silica, wet silica, talc, ceramic, other inorganic minerals (for example, sericite, quartz, sulfur, active carbon, and calcium carbonate), chemical fertilizers (for example, ammonium sulfate, ammonium phosphate, ammonium nitrate, urea, and ammonium chloride), and the others; as well as synthetic resins (for example, polyester resins such as polypropylene, polyacrylonitrile, polymethylmethacrylate, and polyethylene terephthalate; nylon resins such as nylon-6, nylon-11, and nylon-66; polyamide resins; polyvinyl chloride, polyvinylidene chloride, vinyl chloride-propylene copolymers, and the others).

Examples of the liquid carrier(s) include water; alcohols (for example, methanol, ethanol, isopropyl alcohol, butanol, hexanol, benzyl alcohol, ethylene glycol, propylene glycol, and phenoxy ethanol); ketones (for example, acetone, methyl ethyl ketone, and cyclohexanone); aromatic hydrocarbons (for example, toluene, xylene, ethylbenzene, dodecylbenzene, phenyl xylyl ethane, and methylnaphthalene); aliphatic hydrocarbons (for example, hexane, cyclohexane, kerosene, and light oil); esters (for example, ethyl acetate, butyl acetate, isopropyl myristate, ethyl oleate, diisopropyl adipate, diisobutyl adipate, and propylene glycol monomethyl ether acetate); nitriles (for example, acetonitrile and isobutyronitrile); ethers (for example, diisopropyl ether, 1,4-dioxane, 1,2-dimethoxyethane, diethylene glycol dimethyl ether, diethylene glycol monomethyl ether, propylene glycol monomethyl ether, dipropylene glycol monomethyl ether, and 3-methoxy-3-methyl-1-butanol); amides (for example, DMF and N,N-dimethylacetamide); sulfoxides (for example, DMSO); propylene carbonate; and vegetable oils (for example, soybean oil and cottonseed oil).

Examples of the surfactant(s) include nonionic surfactants such as polyoxyethylene alkyl ethers, polyoxyethylene alkyl aryl ethers, and polyethylene glycol fatty acid esters; and anionic surfactants such as alkyl sulfonates, alkylbenzene sulfonates, and alkyl sulfates. Specific examples thereof include Nimbus (registered trademark), Assist (registered trademark), Aureo (registered trademark), Iharol (registered trademark), Silwet L-77 (registered trademark), BreakThru (registered trademark), SundanceII (registered trademark), Induce (registered trademark), Penetrator (registered trademark), AgriDex (registered trademark), Lutensol A8 (registered trademark), NP-7 (registered trademark), Triton (registered trademark), Nufilm (registered trademark), Emulgator NP7 (registered trademark), Emulad (registered trademark), TRITON X 45 (registered trademark), AGRAL 90 (registered trademark), AGROTIN (registered trademark), ARPON (registered trademark), EnSpray N (registered trademark), and BANOLE (registered trademark).

Examples of the other auxiliary agent(s) for formulation include binders, dispersants, colorants, and stabilizers. Specific examples thereof include casein, gelatin, saccharides (for example, starch, gum arabic, cellulose derivatives, and alginic acid), lignin derivatives, bentonite, water-soluble synthetic polymers (for example, polyvinyl alcohol, polyvinyl pyrrolidone, and polyacrylic acids), acidic isopropyl phosphate, 2,6-di-tert-butyl-4-methylphenol, and BHA (a mixture of 2-tert-butyl-4-methoxyphenol and 3-tert-butyl-4-methoxyphenol).

Further, the Present composition may also be prepared by formulating each of the Present compound A and the Present compound B according to the above method, then diluting each formulation with water as needed, and mixing each formulation or diluted solution thereof.

The Present composition may further comprise other one or more fungicide(s) and/or insecticide(s).

The Present composition can control plant diseases caused by plant pathogenic microorganisms such as fungi, Oomycete, Phytomyxea, and bacteria. Examples of the fungi include Ascomycota, Basidiomycota, Blastocladiomycota, Chytridiomycota, Mucoromycota, and Olpidiomycota. Specific examples thereof include the followings. The scientific name of plant pathogenic microorganism which causes each disease is shown in parentheses.

Rice Diseases:

blast (*Pyricularia oryzae*), brown spot (*Cochliobolus miyabeanus*), sheath blight (*Rhizoctonia solani*), bakanae disease (*Gibberella fujikuroi*), downy mildew (*Sclerophthora macrospora*), false blast and head blight (*Epicoccum nigrum*), and seedling blight (*Trichoderma viride* and *Rhizopus oryzae*);

Wheat Diseases:

powdery mildew (*Blumeria graminis*), *Fusarium* blight (*Fusarium graminearum, Fusarium avenaceum, Fusarium culmorum*, and *Microdochium nivale*), stripe rust (*Puccinia striiformis*), stem rust (*Puccinia graminis*), leaf rust (*Puccinia recondita*), snow mould (*Microdochium nivale* and *Microdochium majus*), *Typhula* snow blight (*Typhula incarnata* and *Typhula ishikariensis*), loose smut (*Ustilago tritici*), stinking smut (*Tilletia caries* and *Tilletia controversa*), eyespot (*Pseudocercosporella herpotrichoides*), leaf blotch (*Septoria tritici*), glume blotch (*Stagonospora nodorum*), tan spot (*Pyrenophora tritici*-repentis), *rhizoctonia* seeding blight (*Rhizoctonia solani*), take-all disease (*Gaeumannomyces graminis*), and blast (*Pyricularia graminis-tritici*);

Barley Diseases:

powdery mildew (*Blumeria graminis*), *Fusarium* head blight (*Fusarium graminearum, Fusarium avenaceum, Fusarium culmorum*, and *Microdochium nivale*), stripe rust (*Puccinia striiformis*), stem rust (*Puccinia graminis*), dwarf leaf rust (*Puccinia hordei*), loose smut (*Ustilago nuda*), scald (*Rhynchosporium secalis*), net blotch (*Pyrenophora teres*), spot blotch (*Cochliobolus sativus*), stripe (*Pyrenophora graminea*), *Ramularia* disease (*Ramularia collo-cygni*), and *rhizoctonia* seeding blight (*Rhizoctonia solani*);

Corn Diseases:

rust (*Puccinia sorghi*), southern rust (*Puccinia polysora*), northern leaf blight (*Setosphaeria turcica*), tropical rust (*Physopella zeae*), southern leaf blight (*Cochliobolus heterostrophus*), anthracnose (*Colletotrichum graminicola*), gray leaf spot (*Cercospora zeae-maydis*), eyespot (*Kabatiella zeae*), *Phaeosphaeria* leaf spot (*Phaeosphaeria maydis*), *Diplodia* rot (*Stenocarpella maydis* and *Stenocarpella macrospora*), stalk rot (*Fusarium graminearum, Fusarium verticillioides*, and *Colletotrichum graminicola*), smut (*Ustilago maydis*), and *Physoderma* brown spot and *Physoderma* stalk rot (*Physoderma maydis*);

Cotton Diseases:

anthracnose (*Colletotrichum gossypii*), grey mildew (*Ramularia areola*), *Alternaria* leaf spot (*Alternaria macrospora* and *Alternaria gossypii*), and black root rot (*Thielaviopsis basicola*);

Coffee Diseases:

rust (*Hemileia vastatrix*) and leaf spot (*Cercospora coffeicola*);

Rape Seed Diseases:

*Sclerotinia* rot (*Sclerotinia sclerotiorum*), gray leaf spot (*Alternaria brassicae*), root rot (*Phoma lingam*), and light leaf spot (*Pyrenopeziza brassicae*);

Sugar Cane Diseases:

rust (*Puccinia melanocephala* and *Puccinia kuehnii*) and smut (*Ustilago scitaminea*);

Sunflower Diseases:

rust (*Puccinia helianthi*) and downy mildew (*Plasmopara halstedii*);

Citrus Diseases:

melanose (*Diaporthe citri*), scab (*Elsinoe fawcettii*), green mold (*Penicillium digitatum*), blue mold (*Penicillium italicum*), *Phytophthora* rot (*Phytophthora parasitica* and *Phytophthora citrophthora*), and *Aspergillus* rot (*Aspergillus niger*);

Apple Diseases:

blossom blight (*Monilinia mali*), *Valsa* canker (*Valsa ceratosperma*), powdery mildew (*Podosphaera leucotricha*), *Alternaria* leaf spot (*Alternaria alternata* apple pathotype), scab (*Venturia inaequalis*), bitter rot (*Glomerella cingulata* and *Colletotrichum acutatum*), blotch (*Diplocarpon mali*), ring rot (*Botryosphaeria berengeriana*), crown rot (*Phytophthora cactorum*), and rust (*Gymnosporangium juniperi-virginianae* and *Gymnosporangium yamadae*);

Pear Diseases:

scab (*Venturia nashicola* and *Venturia pirina*), black spot (*Alternaria alternata* Japanese pear pathotype), and rust (*Gymnosporangium haraeanum*);

Peach Diseases:

brown rot (*Monilinia fructicola*), scab (*Cladosporium carpophilum*), *Phomopsis* rot (*Phomopsis* sp.), and leaf curl (*Taphrina deformans*);

Grapes Diseases:

anthracnose (*Elsinoe ampelina*), ripe rot (*Glomerella cingulata* and *Colletotrichum acutatum*), powdery mildew (*Uncinula necator*), rust (*Phakopsora ampelopsidis*), black rot (*Guignardia bidwellii*), and downy mildew (*Plasmopara viticola*);

Japanese Persimmon Diseases:

anthracnose (*Gloeosporium kaki* and *Colletotrichum acutatum*) and leaf spot (*Cercospora kaki* and *Mycosphaerella nawae*);

Diseases of Gourd Family:

anthracnose (*Colletotrichum lagenarium*), powdery mildew (*Sphaerotheca fuliginea*), gummy stem blight (*Didymella bryoniae*), *Corynespora* leaf spot (*Corynespora cassiicola*), *Fusarium* wilt (*Fusarium oxysporum*), downy mildew (*Pseudoperonospora cubensis*), *Phytophthora* rot (*Phytophthora capsici*), and damping-off (*Pythium* sp.);

Tomato Diseases:

early blight (*Alternaria solani*), leaf mold (*Cladosporium fulvum*), *Cercospora* leaf mold (*Pseudocercospora fuligena*), late blight (*Phytophthora infestans*), and powdery mildew (*Leveillula taurica*);

Eggplant Diseases:

brown spot (*Phomopsis vexans*) and powdery mildew (*Erysiphe cichoracearum*);

Cruciferous Vegetables Diseases:

*Alternaria* leaf spot (*Alternaria japonica*), white spot (*Cercosporella brassicae*), clubroot (*Plasmodiophora brassicae*), downy mildew (*Peronospora parasitica*), and white rust (*Albugo candida*);

Welsh Onion Disease:

rust (*Puccinia allii*);

Soybean Diseases:

purple stain (*Cercospora kikuchii*), *Sphaceloma* scab (*Elsinoe glycines*), pod and stem blight (*Diaporthe phaseolorum* var. *sojae*), rust (*Phakopsora pachyrhizi*), target spot (*Corynespora cassiicola*), anthracnose (*Colletotrichum glycines* and *Colletotrichum truncatum*), *Rhizoctonia* rot (*Rhizoctonia solani*), *Septoria* brown spot (*Septoria glycines*), *Cercospora* leaf spot (*Cercospora sojina*), stem rot (*Sclerotinia sclerotiorum*), powdery mildew (*Microsphaera diffusa*), *Phytophthora* stem and root rot (*Phytophthora sojae*), downy mildew (*Peronospora manshurica*), sudden death syndrome (*Fusarium virguliforme*), red crown rot (*Calonectria ilicicola*), and *Diaporthe/Phomopsis* complex (*Diaporthe longicolla*);

Kidney Bean Diseases:

stem rot (*Sclerotinia sclerotiorum*), rust (*Uromyces appendiculatus*), angular leaf spot (*Phaeoisariopsis griseola*), anthracnose (*Colletotrichum lindemuthianum*), and *Fusarium* root-rot (*Fusarium solani*);

Peanut Diseases:

leaf spot (*Cercospora personata*), brown leaf spot (*Cercospora arachidicola*), southern blight (*Sclerotium rolfsii*), and *Cylindrocladium* black rot (*Calonectria ilicicola*);

Garden Pea Diseases:

powdery mildew (*Erysiphe pisi*) and root rot (*Fusarium solani*);

Potato Diseases:

early blight (*Alternaria solani*), late blight (*Phytophthora infestans*), Pink rot (*Phytophthora erythroseptica*), powdery scab (*Spongospora subterranea* f. sp. *subterranea*), *Verticillium* wilt (*Verticillium albo*-atrum, *Verticillium dahliae*, and *Verticillium nigrescens*), dry rot (*Fusarium solani*), and potato wart (*Synchytrium endobioticum*);

Strawberry Disease:

powdery mildew (*Sphaerotheca humuli*);

Tea Diseases:

net blister blight (*Exobasidium reticulatum*), white scab (*Elsinoe leucospila*), gray blight (*Pestalotiopsis* sp.), and anthracnose (*Colletotrichum theae-sinensis*);

Tobacco Diseases:

brown spot (*Alternaria longipes*), anthracnose (*Colletotrichum tabacum*), blue mold (*Peronospora tabacina*), and black shank (*Phytophthora nicotianae*);

Sugar Beet Diseases:

*Cercospora* leaf spot (*Cercospora beticola*), leaf blight (*Thanatephorus cucumeris*), root rot (*Thanatephorus cucumeris*), *Aphanomyces* root rot (*Aphanomyces cochlioides*), and rust (*Uromyces betae*);

Rose Diseases:

black spot (*Diplocarpon rosae*) and powdery mildew (*Sphaerotheca pannosa*);

*Chrysanthemum* Diseases:

leaf blight (*Septoria chrysanthemi*-indici) and white rust (*Puccinia horiana*);

Onion Diseases:

*Botrytis* leaf blight (*Botrytis cinerea, Botrytis byssoidea*, and *Botrytis squamosa*), gray-mold neck rot (*Botrytis allii*), and small sclerotial neck rot (*Botrytis squamosa*);

Various Crops Diseases:

*Botrytis* rot (*Botrytis cinerea*), *Sclerotinia* rot (*Sclerotinia sclerotiorum*), seedling blight (*Pythium aphanidermatum, Pythium irregulare*, and *Pythium ultimum*);

Japanese Radish Disease:

*Alternaria* leaf spot (*Alternaria brassicicola*);

Turfgrass Diseases:

dollar spot (*Sclerotinia homoeocarpa*), brown patch and large patch (*Rhizoctonia solani*), and *Pythium* blight (*Pythium aphanidermatum*);

Banana Disease:

Sigatoka disease (*Mycosphaerella fijiensis* and *Mycosphaerella musicola*);

Lentils Disease:

*Ascochyta* blight (*Ascochyta lentis*);

Chickpea Disease:

*Ascochyta* blight (*Ascochyta rabiei*);

Green Pepper Disease:
anthracnose (*Colletotrichum scovillei*);
Mango Disease:
anthracnose (*Colletotrichum acutatum*);
Fruit Trees Diseases:
white root rot (*Rosellinia necatrix*) and violet root rot (*Helicobasidium mompa*);

Postharvest Disease of Fruits (for Example, Apple and Pear):
*Mucor* rot disease (*Mucor piriformis*); Seed diseases or diseases in the early stages of the growth of various plants caused by *Aspergillus* spp., *Penicillium* spp., *Fusarium* spp., *Gibberella* spp., *Trichoderma* spp., *Thielaviopsis* spp., *Rhizopus* spp., *Mucor* spp., *Corticium* spp., *Phoma* spp., *Rhizoctonia* spp. *Diplodia* spp., or the like;
Viral Diseases:
Lettuce big-vein disease transmitted by *Olpidium brassicae*, and viral diseases of several crops transmitted by *Polymyxa* spp. (for example, *Polymyxa betae* and *Polymyxa graminis*);
Diseases Caused by Bacteria:
bacterial seedling blight of rice (*Burkholderia plantarii*), bacterial spot of cucumber (*Pseudomonas syringae* pv. *Lachrymans*), bacterial wilt of eggplant (*Ralstonia solanacearum*), canker of *citrus* (*Xanthomonas citri*), bacterial soft rot of Chinese cabbage (*Erwinia carotovora*), scab of potato (*Streptomyces scabiei*), Goss's wilt of corn (*Clavibacter michiganensis*), Pierce's disease of grapes, olive, peach, and the like (*Xylella fastidiosa*), and crown gall of Rosacea plants such as apple, peach, and cherries (*Agrobacterium tumefaciens*);

and the others.

Regarding the above plant pathogenic microorganisms, mutation(s) in each species is/are not specifically limited. Namely, the above plant pathogenic microorganisms also include those which have decreased sensitivity (also referred to as "those which have resistance") to a specific fungicide. The decreased sensitivity may be caused by a mutation in a target site (point mutation), or a factor other than point mutation (non-point mutation). Examples of the point mutation include an amino acid substitution in a target site of a protein caused by a mutation in a nucleic acid sequence moiety (open reading frame) corresponding to the amino acid sequence of the protein, and overexpression of a protein of a target site caused by a mutation such as deletion of a suppressor sequence in a promoter region, amplification of an enhancer sequence, and increase of gene copy number. Examples of the non-point mutation include enhance of a function to discharge a fungicide, which penetrate a cell, out of the cell by ABC transporters, MFS transporters, and the like. Other examples thereof include detoxification of the fungicide by metabolism.

Examples of the above specific fungicide include nucleic acid synthesis inhibitors (for example, phenylamide fungicides, acylamino acid fungicides, and type II DNA topoisomerase fungicides), mitotic division and cell division inhibitors (for example, MBC fungicides and N-phenylcarbamate fungicides), respiration inhibitors (for example, QoI fungicides, QiI fungicides, and SDHI fungicides), amino acid synthesis and protein synthesis inhibitors (for example, anilinopyrimidine fungicides), signaling inhibitors (for example, phenylpyrrole fungicides and dicarboximide fungicides), lipid synthesis and cell membrane synthesis inhibitors (for example, phosphorothiolate fungicides, dithiolane fungicides, aromatic hydrocarbon fungicides, heteroaromatic fungicides, and carbamate fungicides), sterol biosynthesis inhibitors (for example, DMI fungicides such as triazole fungicides, hydroxyanilide fungicides, and aminopyrazolinone fungicides), cell-wall synthesis inhibitors (for example, polyoxin fungicides and carboxylic acid amide fungicides), melanin synthesis inhibitors (for example, MBI-R fungicides, MBI-D fungicides, and MBI-P fungicides), and other fungicides (for example, cyanoacetamidoxime fungicides and phenylacetamide fungicides).

Examples of the amino acid substitution in a target site include the followings.

Cytochrome b: G143A, F129L, G137R, I147V, L275F, Y279C, Y279S, M295L, L299F, A126T, Y132C, C133Y, G137V, G137A, G137S, M139V, T145F, T145R, T145S, T145C, T145L, T145Y, T148M, T148V, T148L, T148I, T148T, N256Y, N256K, N256I, E272D, E272G, E272Q, W273L, W273F, Y274S, Y274F, L275S, L275T, or L295F;

Cyp51 protein: A311G, A379G, A381G, A410T, A61V, D107V, D134G, D282E, D411N, E297K, F120L, F219S, F449S, F489L, F495I, G138C/R/S, G312A, G412A, G432S, G434C, G448S, G460D/A, G462A, G464S, G484S, G510C, G54E/K/R/V/W, G54W, H147Y, H303Y, H399P, I145F, I330T, I381V/A, I471T, I475T, K142R, K143E, K147Q, K175N, K197N, L50S, L98H, M145L, M220K/I/T/V, M288L, N125I, N178S, N22D, N284H, N513K, P216L, P384S, P394L, Q141H, Q88H, R467K, S188N, S208T, S297T, S405F, S508T, S509T, S524T, S52T, S79T, T289A, T440A, T454P, T469S, V101F, V136A/C/G, V490L, Y121F, Y131F/H, Y132F/H/N, Y134F, Y134F, Y136F, Y137F, Y140F/H, Y145F, Y431C, Y459C/D/N/S/P/A, Y461D, Y461D/H/S, Y463D/H/N, Y491H, or Y68N;

β-tubulin: H6L/Y, Y50C/N/S, Q134K, A165V, E198A/D/G/K/L/Q/V, F200Y, M257L, F200Y, F167Y, Q73R, or L240F;

SdhB: H277R/Y, P225H/F/L/T, N230I, H272L/R/V/Y, H278Y/R, H249L/N/Y, H273Y, N225I/T, T268I/A, 1269V, H242R, H257L, or T253I;

SdhC: H134R, P80H/L, A85V, S73P, T90I, 186F, N88S, H154Y/R, K49E, R64K, N75S, G79R, S135R, N87S, H153R, H146R, I29V, N33T, N34T, T791/N, W80S, A84V, N86K/S/A, G90R, R151T/S, H152R, I161S, G169D, or H151R;

SdhD: H133R, H132R, S89P, G109V, D124E/N, H134R, G138V, D145G, I50F, M114V, or D129E;

OS-1(Shk1): E753K, G420D, 1365N/R/S, V368F, Q369H/P, N373S, T447S, F267L, L290S, T765R, Q777R, T489I, E599K, or G736Y;

ERG27: S9G, F26S, P57A, T63I, G170R, V192I, L195F, N196T, A210G, I232M, P238S/Δ, P250S, P269L, P298Δ, V309M, A314V, S336C, V365A, E368D, N369D, E375K, A378T, L400F/S, Y408S, F412I/S/V/C, A461S, or R496T;

and the others.

Also, examples of the plant pathogenic microorganisms and host plants thereof which have decreased sensitivity to a fungicide by the overexpression of Cyp51 gene include the followings. *Septoria tritici* in wheat (Reference: Pest Management Science. 2012. 68(7). 1034-1040), *Rhynchosporium secalis* in barley (Reference: Molecular Biology and Evolution. 2014. 31(7). 1793-1802), *Phakopsora pachyrhizi* in soybean (Reference: Pest Management Science. 2014. 70(3). 378-388), *Venturia inaequalis* in apple (Reference: Phytopathology. 2016. 106(6). 562-571), and *Penicillium digitatum* in *citrus* (Reference: Applied and Environmental Microbiology. 2000. 66(8). 3421-3426).

The plant pathogenic microorganisms which can be controlled by the Present composition may have two or more of the above amino acid substitutions. In this case, the two or more amino acid substitutions may be present in an identical protein or different proteins with each other. Also, said plant pathogenic microorganisms may have two or more non-point mutations and point mutations. Examples thereof include plant pathogenic microorganisms which cause amino acid substitutions of G143A, F129L, and G137R in cytochrome b; plant pathogenic microorganisms which have an amino acid substitution of G143A in cytochrome b and an amino acid substitution of A311G in Cyp51; plant pathogenic microorganisms which have amino acid substitutions of G143A and F129L in cytochrome b and an amino acid substitution of A311G in Cyp51; and plant pathogenic microorganisms which have amino acid substitutions of G143A and F129L in cytochrome b and an amino acid substitution of H6L/Y in β-tubulin, and further overexpress Cyp51 gene.

Examples of the plant pathogenic microorganisms having a point mutation include the followings.

*Alternaria alternata* having an amino acid substitution of G143A in cytochrome b;

*Alternaria arborescens* having an amino acid substitution of G143A in cytochrome b;

*Alternaria solani* having an amino acid substitution of F129L in cytochrome b;

*Alternaria tomato* having an amino acid substitution of G143A in cytochrome b;

*Botryotinia fuckeliana* having an amino acid substitution of G143A in cytochrome b;

*Glomerella graminicola* having an amino acid substitution of G143A in cytochrome b;

*Corynespora cassiicola* having an amino acid substitution of G143A in cytochrome b;

*Cercospora beticola* having an amino acid substitution of G143A in cytochrome b;

*Cercospora sojina* having an amino acid substitution of G143A in cytochrome b;

*Cladosporium carpophilum* having an amino acid substitution of G143A in cytochrome b;

*Colletotrichum graminicola* having an amino acid substitution of G143A in cytochrome b;

*Glomerella cingulata* having an amino acid substitution of G143A in cytochrome b;

*Blumeria graminis* f. sp. *hordei* having an amino acid substitution of G143A in cytochrome b;

*Blumeria graminis* f. sp. *tritici* having an amino acid substitution of G143A in cytochrome b;

*Parastagonospora nodorum* having an amino acid substitution of G143A in cytochrome b;

*Monographella nivalis* having an amino acid substitution of G143A in cytochrome b;

*Microdochium majus* and *nivale* having an amino acid substitution of G143A in cytochrome b;

*Mycosphaerella fijiensis* having an amino acid substitution of G143A in cytochrome b;

*Didymella rabiei* having an amino acid substitution of G143A in cytochrome b;

*Phakopsora pachyrhizi* having an amino acid substitution of F129L in cytochrome b;

*Plasmopara viticola* having an amino acid substitution of F129L or G143A in cytochrome b;

*Pleospora allii* having an amino acid substitution of G143A in cytochrome b;

*Podosphaera fusca* having an amino acid substitution of G143A in cytochrome b;

*Podosphaera xanthii* having an amino acid substitution of G143A in cytochrome b;

*Pseudoperonospora cubensis* having an amino acid substitution of G143A in cytochrome b;

*Magnaporthe oryzae* having an amino acid substitution of F129L or G143A in cytochrome b;

*Pyrenophora teres* having an amino acid substitution of F129L in cytochrome b;

*Pyrenophora tritici*-repentis having an amino acid substitution of F129L, G137R, or G143A in cytochrome b;

*Pythium aphanidermatum* having an amino acid substitution of F129L in cytochrome b;

*Thanatephorus cucumeris* having an amino acid substitution of F129L or G143A in cytochrome b;

*Ramularia collo-cygni* having an amino acid substitution of G143A in cytochrome b;

*Rhynchosporium secalis* having an amino acid substitution of G143A in cytochrome b;

*Rhizoctonia solani* having an amino acid substitution of F129L in cytochrome b;

Zymo *Septoria tritici* having an amino acid substitution of F129L, G137R, or G143A in cytochrome b;

*Erysiphe necator* having an amino acid substitution of G143A in cytochrome b;

*Venturia inaequalis* having an amino acid substitution of G143A in cytochrome b;

*Saccharomyces cerevisiae* having an amino acid substitution of I147V in cytochrome b;

*Saccharomyces cerevisiae* having an amino acid substitution of L275F in cytochrome b;

*Saccharomyces cerevisiae* having an amino acid substitution of Y279C in cytochrome b;

*Saccharomyces cerevisiae* having an amino acid substitution of Y279S in cytochrome b;

*Saccharomyces cerevisiae* having an amino acid substitution of M295L in cytochrome b;

*Puccinia horiana* having an amino acid substitution of L299F in cytochrome b;

fungi and Oomycota having an amino acid substitution of L299F in cytochrome b;

fungi and Oomycota having an amino acid substitution of A126T in cytochrome b;

fungi and Oomycota having an amino acid substitution of Y132C in cytochrome b;

fungi and Oomycota having an amino acid substitution of C133Y in cytochrome b;

fungi and Oomycota having an amino acid substitution of G137V in cytochrome b;

fungi and Oomycota having an amino acid substitution of G137A in cytochrome b;

fungi and Oomycota having an amino acid substitution of G137S in cytochrome b;

fungi and Oomycota having an amino acid substitution of M139V in cytochrome b;

fungi and Oomycota having an amino acid substitution of T145F in cytochrome b;

fungi and Oomycota having an amino acid substitution of T145R in cytochrome b;

fungi and Oomycota having an amino acid substitution of T145S in cytochrome b;

fungi and Oomycota having an amino acid substitution of T145C in cytochrome b;

fungi and Oomycota having an amino acid substitution of T145L in cytochrome b;

fungi and Oomycota having an amino acid substitution of T145Y in cytochrome b;

fungi and Oomycota having an amino acid substitution of T148M in cytochrome b;

fungi and Oomycota having an amino acid substitution of T148V in cytochrome b;

fungi and Oomycota having an amino acid substitution of T148L in cytochrome b;

fungi and Oomycota having an amino acid substitution of T148I in cytochrome b;

fungi and Oomycota having an amino acid substitution of T148T in cytochrome b;

fungi and Oomycota having an amino acid substitution of N256Y in cytochrome b;

fungi and Oomycota having an amino acid substitution of N256K in cytochrome b;

fungi and Oomycota having an amino acid substitution of N256I in cytochrome b;

fungi and Oomycota having an amino acid substitution of E272D in cytochrome b;

fungi and Oomycota having an amino acid substitution of E272G in cytochrome b;

fungi and Oomycota having an amino acid substitution of E272Q in cytochrome b;

fungi and Oomycota having an amino acid substitution of W273L in cytochrome b;

fungi and Oomycota having an amino acid substitution of W273F in cytochrome b;

fungi and Oomycota having an amino acid substitution of Y274S in cytochrome b;

fungi and Oomycota having an amino acid substitution of Y274F in cytochrome b;

fungi and Oomycota having an amino acid substitution of L275S in cytochrome b;

fungi and Oomycota having an amino acid substitution of L275T in cytochrome b;

fungi and Oomycota having an amino acid substitution of L295F in cytochrome b;

*Ajellomyces capsulatus* having an amino acid substitution of Y136F in Cyp51;

*Aspergillus flavus* having an amino acid substitution of Y132N, K197N, D282E, M288L, T469S, H399P, D411N, or T454P in Cyp51;

*Aspergillus fumigatus* having an amino acid substitution of N22D, S52T, G54E/K/R/V/W, Y68N, Q88H, L98H, V101F, Y121F, N125I, G138C/R/S, Q141H, H147Y, P216L, F219S, M220K/I/T/V, T289A, S297T, P394L, Y431C, G432S, G434C, T440A, G448S, Y491H, or F495I in Cyp51;

*Aspergillus parasiticus* having an amino acid substitution of G54W in Cyp51;

*Candida albicans* having an amino acid substitution of A61V, Y132F/H, K143E, S405F, F449S, G464S, R467K, or I471T in Cyp51;

*Cercospora beticola* having an amino acid substitution of E297K, I330T, or P384S in Cyp51;

*Blumeria graminis* f. sp. *hordei* having an amino acid substitution of Y136F, K147Q, or S509T in Cyp51;

*Blumeria graminis* f. sp. *tritici* having an amino acid substitution of S79T, Y136F, or K175N in Cyp51;

*Filobasidiella neoformans* having an amino acid substitution of Y145F or G484S in Cyp51;

*Monilinia fructicola* having an amino acid substitution of Y136F in Cyp51;

*Mycosphaerella fijiensis* having an amino acid substitution of Y136F, A313G, A381G, Y461D, G462A, or Y463D/H/N in Cyp51;

*Phakopsora pachyrhizi* having an amino acid substitution of F120L, Y131F/H, K142R, I145F, or I475T in Cyp51;

*Puccinia triticina* having an amino acid substitution of Y134F in Cyp51;

*Pyrenophora teres* having an amino acid substitution of F489L in Cyp51;

*Pyrenopeziza brassicae* having an amino acid substitution of S508T in Cyp51;

*Saccharomyces cerevisiae* having an amino acid substitution of Y140F/H in Cyp51;

Zymo *Septoria tritici* having an amino acid substitution of L50S, D107V, D134G, V136A/C/G, Y137F, M145L, N178S, S188N, S208T, N284H, H303Y, A311G, G312A, A379G, I381V/A, A410T, G412A, Y459C/D/N/S/P/A, G460D/A, Y461D/H/S, V490L, G510C, N513K, or S524T in Cyp51;

*Erysiphe necator* having an amino acid substitution of Y136F in Cyp51;

*Emericella nidulans* having an amino acid substitution of H6L/Y, Y50N/S, Q134K, A165V, E198D/K/Q, F200Y, or M257L in β-tubulin;

*Botryotinia fuckeliana* having an amino acid substitution of E198A/G/K/V or F200Y in β-tubulin;

*Cochliobolus heterostrophus* having an amino acid substitution of F167Y in β-tubulin;

*Cercospora beticola* having an amino acid substitution of F167Y or E198A in β-tubulin;

*Gibberella fujikuroi* having an amino acid substitution of Y50N, E198V, or F200Y in β-tubulin;

*Gibberella zeae* having an amino acid substitution of Y50C, Q73R, F167Y, E198K/L/Q, or F200Y in β-tubulin;

*Helminthosporium solani* having an amino acid substitution of E198A/Q in β-tubulin;

*Hypomyces odoratus* having an amino acid substitution of Y50C in β-tubulin;

*Parastagonospora nodorum* having an amino acid substitution of H6Y in β-tubulin;

*Monilinia fructicola* having an amino acid substitution of H6Y or E198A/K in β-tubulin;

*Monilinia laxa* having an amino acid substitution of L240F in β-tubulin;

*Microdochium majus* and *nivale* having an amino acid substitution of E198A in β-tubulin;

*Mycosphaerella fijiensis* having an amino acid substitution of E198A in β-tubulin;

*Neurospora crassa* having an amino acid substitution of F167Y or E198G in β-tubulin;

*Penicillium aurantiogriseum* having an amino acid substitution of E198A/K or F200Y in β-tubulin;

*Penicillium expansum* having an amino acid substitution of F167Y or E198A/K/V in β-tubulin;

*Penicillium italicum* having an amino acid substitution of E198K or F200Y in β-tubulin;

*Pyrenopeziza brassicae* having an amino acid substitution of L240F in β-tubulin;

*Rhynchosporium secalis* having an amino acid substitution of E198G/K or F200Y in β-tubulin;

*Sclerotinia homoeocarpa* having an amino acid substitution of E198A/K in β-tubulin;

*Sclerotinia sclerotiorum* having an amino acid substitution of E198A in β-tubulin;

Zymo *Septoria tritici* having an amino acid substitution of E198A/G in β-tubulin;

*Venturia inaequalis* having an amino acid substitution of E198A/K, F200Y, or L240F in R-tubulin;

*Alternaria alternata* having an amino acid substitution of H277R/Y in SdhB;

*Alternaria solani* having an amino acid substitution of H277R/Y in SdhB;

*Botryotinia fuckeliana* having an amino acid substitution of P225H/F/L/T, N230I, or H272L/R/V/Y in SdhB;

*Corynespora cassiicola* having an amino acid substitution of H278Y/R in SdhB;

*Stagonosporopsis cucurbitacearum* having an amino acid substitution of H277R/Y in SdhB;

*Eurotium oryzae* having an amino acid substitution of H249L/N/Y in SdhB;

*Pyrenophora teres* having an amino acid substitution of H277Y in SdhB;

*Sclerotinia sclerotiorum* having an amino acid substitution of H273Y in SdhB;

Zymo *Septoria tritici* having an amino acid substitution of N225I/T, H273Y, T268I/A, or I269V in SdhB;

*Erysiphe necator* having an amino acid substitution of H242R in SdhB;

*Ustilago maydis* having an amino acid substitution of H257L in SdhB;

*Venturia inaequalis* having an amino acid substitution of T253I in SdhB;

*Alternaria alternata* having an amino acid substitution of H134R in SdhC;

*Botryotinia fuckeliana* having an amino acid substitution of P80H/L or A85V in SdhC;

*Corynespora cassiicola* having an amino acid substitution of S73P in SdhC;

*Eurotium oryzae* having an amino acid substitution of T90I in SdhC;

*Phakopsora pachyrhizi* having an amino acid substitution of I86F, N88S, or H154Y/R in SdhC;

*Pyrenophora teres* having an amino acid substitution of K49E, R64K, N75S, G79R, H134R, or S135R in SdhC;

*Ramularia collo-cygni* having an amino acid substitution of N87S, H146R, or H153R in SdhC;

*Sclerotinia sclerotiorum* having an amino acid substitution of H146R in SdhC;

Zymo *Septoria tritici* having an amino acid substitution of I29V, N33T, N34T, T791/N, W80S, A84V, N86K/S/A, G90R, R151T/S, H152R, or I161S in SdhC;

*Erysiphe necator* having an amino acid substitution of G169D in SdhC;

*Venturia inaequalis* having an amino acid substitution of H151R in SdhC;

*Alternaria alternata* having an amino acid substitution of H133R in SdhD;

*Alternaria solani* having an amino acid substitution of H133R in SdhD;

*Botryotinia fuckeliana* having an amino acid substitution of H132R in SdhD;

*Corynespora cassiicola* having an amino acid substitution of S89P or G109V in SdhD;

*Eurotium oryzae* having an amino acid substitution of D124E in SdhD;

*Pyrenophora teres* having an amino acid substitution of D124E/N, H134R, G138V, or D145G in SdhD;

*Sclerotinia sclerotiorum* having an amino acid substitution of H132R in SdhD;

Zymo *Septoria tritici* having an amino acid substitution of I50F, M114V, or D129E in SdhD;

*Phytophthora capsici* having an amino acid substitution of Q1077K or V1109L/M in CesA3;

*Phytophthora drechsleri* having an amino acid substitution of V1109L in CesA3;

*Phytophthora infestans* having an amino acid substitution of G1105A/V or V1109L in CesA3;

*Plasmopara viticola* having an amino acid substitution of G1105S/V in CesA3;

*Pseudoperonospora cubensis* having an amino acid substitution of G1105V/W in CesA3;

*Alternaria brassicicola* having an amino acid substitution of E753K in OS-1(Shk1);

*Alternaria longipes* having an amino acid substitution of G420D in OS-1(Shk1);

*Botryotinia fuckeliana* having an amino acid substitution of I365N/R/S, V368F, Q369H/P, N373S, or T447S in OS-1 (Shk1);

*Pleospora allii* having an amino acid substitution of F267L, L290S, T765R, or Q777R in OS-1(Shk1);

*Sclerotinia sclerotiorum* having an amino acid substitution of T489I, E599K, or G736Y in OS-1(Shk1);

*Botryotinia fuckeliana* having an amino acid substitution of S9G, F26S, P57A, T63I, G170R, V192I, L195F, N196T, A210G, 1232M, P238S/A, P250S, P269L, P298A, V309M, A314V, S336C, V365A, E368D, N369D, E375K, A378T, L400F/S, Y408S, F412I/S/V/C, A461S, or R496T in ERG27;

and the others.

Zymo *Septoria tritici* means the same species as *Septoria tritici.*

Examples of the plants to which the Present composition can apply include the following plants.

Crops: corn (dent corn, flint corn, flour corn, popcorn, waxy corn, and sweet corn), rice (long grain rice, short grain rice, medium grain rice, *japonica* rice, tropical *japonica* rice, indica rice, *javanica* rice, paddy rice, upland rice, floating rice, direct-seeded rice, transplanted rice, and glutinous rice), wheat (bread wheat (hard wheat, soft wheat, medium wheat, red wheat, and white wheat), macaroni wheat, spelt wheat, and club wheat, autumn-sown type and spring-sown type of them), barley (two-rowed barley (=barley for brewery), six-rowed barley, hull-less barley, and pearl barley, autumn-sown type and spring-sown type of them), rye (autumn-sown type and spring-sown type), triticale (autumn-sown type and spring-sown type), oat (autumn-sown type and spring-sown type), sorghum, cotton (upland cotton and Pima cotton), soybean (indeterminate type, determinate type, and semi-determinate type), peanut, kidney bean, lima bean, adzuki bean, black-eyed pea, mung bean, black gram, scarlet runner bean, rice bean, moth bean, tepary bean, broad bean, pea, chickpea, lentil, lupine, pigeon pea, alfalfa, buckwheat, beet, rapeseed, canola (autumn-sown type and spring-sown type), sunflower, sugar cane, tobacco, and the others;

Vegetables: solanaceous vegetables (for example, eggplant, tomato, pimento, pepper, bell pepper, and potato), cucurbitaceous vegetables (for example, cucumber, pumpkin, zucchini, water melon, melon, and squash), cruciferous vegetables (for example, Japanese radish, white turnip, horseradish, kohlrabi, Chinese cabbage, cabbage, leaf mustard, broccoli, and cauliflower), asteraceous vegetables (for example, burdock, crown daisy, artichoke, and lettuce), liliaceous vegetables (for example, welsh onion, onion, garlic, and asparagus), ammiaceous vegetables (for example, carrot, parsley, celery, and parsnip), chenopodiaceous vegetables (for example, spinach and Swiss chard), lamiaceous vegetables (for example, *perilla*, mint, basil, and lavender), strawberry, sweet potato, glutinous yam, eddoe, and the others;

Fruits: pomaceous fruits (for example, apple, pear, Japanese pear, Chinese quince, and quince), stone fleshy fruits (for example, peach, plum, nectarine, Japanese apricot (*Prunus mume*), cherry fruit, apricot, and prune), *citrus* fruits (for example, *Citrus unshiu*, orange, lemon, lime, and grapefruit), nuts (for example, chestnuts, walnuts, hazelnuts, almond, pistachio, cashew nuts, and macadamia nuts), berry fruits (for example, blueberry, cranberry, blackberry, and raspberry), grapes, Japanese persimmon, olive, Japanese plum, banana, coffee, date palm, coconuts, and the others; and Others: tea, mulberry, flowering plants, roadside trees (for example, ash, birch, dogwood, *eucalyptus, ginkgo* (*Ginkgo biloba*), lilac, maple, oak (*Quercus*), poplar, Judas tree, Formosan gum (*Liquidambar formosana*), plane tree, *zelkova*, Japanese arborvitae (*Thuja standishii*), fir wood, hemlock, juniper, *pinus, picea*, and yew (*Taxus cuspidate*)), flowers, foliage plants, turfs, grasses, and the others.

The cultivars of the above plants are not specifically limited as long as they are generally cultivated cultivars.

The above plants may be plants producible by natural crossing, plants producible by a mutation, F1 hybrid plants, or transgenic plants (also referred to as "genetically modified plants"). These plants generally have characteristics such as tolerance to herbicides, accumulation of substances harmful to pests (also referred to as "pests resistance"), infection inhibition against diseases (also referred to as "diseases resistance"), increase in yield potential, improvement in resistance to biotic and abiotic stress factors, and quality modification of products (for example, increase and decrease in component contents, change in composition, and improvement in preservability or processability).

The method for controlling plant diseases of the present invention (hereinafter referred to as "Present control method" or "Control method of the present invention") is carried out by applying an effective amount of the Present compound A and the Present compound B to plants or soil for cultivating plants.

Said plants include whole plants and specific parts of plants. Examples of the specific parts of plants include foliages, flowers, ears, fruits, tree stems, branches, tree crowns, seeds, bulbs, and seedlings. The term of "bulb" means bulb, corm or solid bulb, rhizome, tuber, tuberous root, cane cuttings, and rhizophore. In the Present control method, the weight ratio of the amount of the Present compound A to be applied to the amount of the Present compound B to be applied is usually within the range of 1:0.01 to 1:100, preferably 1:0.1 to 1:10, more preferably 1:0.2 to 1:5, and still more preferably 1:0.3 to 1:3.

In the Present control method, the Present compound A and the Present compound B may be applied separately to plants or soil for cultivating plants in the same period, but are usually applied as the Present composition in terms of a convenience on the application.

In the Present control method, examples of the method for applying the Present compound A and the Present compound B include foliage treatment, soil treatment, root treatment, and seed treatment.

Examples of said foliage treatment include a method for applying the Present compound A and the Present compound B onto surfaces of cultivated plants by foliar application and stem application.

Examples of said root treatment include a method for soaking whole plants or plant roots into a medicinal solution comprising the Present compound A and the Present compound B, and a method for attaching a solid formulation comprising the Present compound A, the Present compound B, and solid carrier(s) to plant roots.

Examples of said soil treatment include soil broadcast, soil incorporation, and chemical irrigation of the Present compound A and the Present compound B to soil.

Examples of said seed treatment include application of the Present composition to plant seeds to be protected from plant diseases. Specific examples thereof include spray treatment by spraying a suspension of the Present composition in a mist form onto seed surfaces, smear treatment by applying the Present composition formulated into a wettable powder, an emulsifiable concentrate, or a flowable with optional addition of a small amount of water as needed to seeds, immersion treatment by immersing seeds into a solution of the Present composition for a certain period of time, film-coating treatment, and pellet-coating treatment. Also, the Present composition may be applied to plant bulbs by the same method as the above spray treatment and smear treatment.

The amount of the Present compound A and the Present compound B to be applied in the Present control method may be varied depending on the kind of plants to be applied, the kind or occurrence frequency of plant diseases to be controlled, the dosage form, the application period, the application method, the application site, the climate condition, and the like. In case of application to plant foliage or soil for cultivating plants, the total amount of the Present compound A and the Present compound B is usually within the range of 1 to 500 g, preferably 2 to 200 g, and more preferably 10 to 100 g, per 1000 $m^2$. Also, in case of application to seeds, the total amount of the Present compound A and the Present compound B to be applied is usually within the range of 0.001 to 10 g, and preferably 0.01 to 1 g, per 1 kg of seeds.

An emulsifiable concentrate, a wettable powder, a flowable, and the like are usually applied by diluting them with water and then spraying them. In this case, the total concentration of the Present compound A and the Present compound B is usually within the range of 0.0005 to 2% by weight, and preferably 0.005 to 1% by weight. A dust formulation, a granule, and the like are usually applied as themselves without diluting them.

EXAMPLES

Hereinafter, the present invention is illustrated more in detail by Preparation Examples and Examples of the Present compound A, Formulation Examples of the Present composition, Test Examples, and the like, but the present invention is not limited to these Examples only.

First, Preparation Examples of the Present compound A are shown below.

In the present description, Me represents a methyl group, Et represents an ethyl group, Pr represents a propyl group, i-Pr represents an isopropyl group, Bu represents a butyl group, i-Bu represents an isobutyl group, s-Bu represents a s-butyl group, t-Bu represents a t-butyl group, c-Pr represents a cyclopropyl group, and Ph represents a phenyl group. When Ph has substituent(s), the substituent(s) is/are indicated before the symbol with the substitution position(s). For example, 2-Me-Ph represents a 2-methylphenyl group.

Reference Preparation Example 1

A mixture of methyl (3Z)-2-(5-bromo-2-methylphenoxy)-3-methoxyacrylate prepared according to the method described in WO 2001/000562 pamphlet (hereinafter referred to as "Intermediate compound 1") (5.0 g), triethylamine (15 mL), copper(I) iodide (0.32 g), $PdCl_2(PPh_3)_2$ (1.17 g), trimethylsilylacetylene (11.5 mL), and acetonitrile (25 mL) was stirred under nitrogen atmosphere at 80° C. for 4 hours. The resulting mixture was concentrated under reduced pressure, and subjected to silica gel column chromatography to give methyl (3Z)-2-[5-(2-trimethylsilylethynyl)-2-methylphenoxy]-3-methoxyacrylate (hereinafter referred to as "Intermediate compound 2"). To a mixture of the Intermediate compound 2 (1.5 g) and THF (20 mL) was added tetrabutylammonium fluoride (1 M solution in tetrahydrofuran) (4.0 mL) at 0° C., and the resulting mixture was stirred at room temperature for 16 hours. To the resulting mixture were sequentially added water and 4N hydrochloric acid, and the resulting mixture was extracted with MTBE. The resulting organic layer was dried over sodium sulfate, and concentrated under reduced pressure. The resulting residue was subjected to silica gel column chromatography to give the Intermediate compound 3 represented by the following formula (0.72 g).

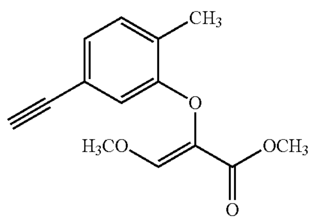 [SMILES: C#Cc1ccc(C)c(O/C(=C\OC)C(=O)OC)c1]

Intermediate compound 3: $^1$H-NMR ($CDCl_3$) δ: 7.33 (1H, s), 7.12-7.03 (2H, m), 6.84 (1H, d), 3.88 (3H, s), 3.71 (3H, s), 3.00 (1H, s), 2.35 (3H, s).

Reference Preparation Example 2

A mixture of methyl (2E)-2-[(2-methyl-5-bromophenyl) methyl]-3-methoxy-2-propenoate prepared according to the method described in WO 2001/000562 pamphlet (hereinafter referred to as "Intermediate compound 4") (5.2 g), $PdCl_2(PPh_3)_2$ (0.61 g), tributyl (1-ethoxyvinyl)tin (7.0 mL), and 1,4-dioxane (35 mL) was stirred at 100° C. for 2 hours. To the resulting mixture was added 1N hydrochloric acid, and the resulting mixture was stirred at room temperature for 1 hour. The resulting mixture was concentrated under reduced pressure, and extracted with chloroform. The resulting organic layer was concentrated under reduced pressure, and the resulting residue was subjected to silica gel column chromatography to give the Intermediate compound 5 represented by the following formula (1.8 g).

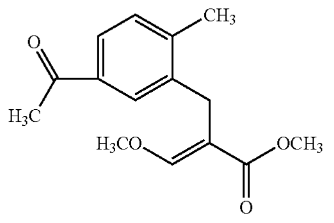 [SMILES: CO/C=C(\Cc1cc(C(C)=O)ccc1C)C(=O)OC]

Intermediate compound 5: $^1$H-NMR ($CDCl_3$) δ: 7.72 (1H, s), 7.67 (1H, dd), 7.50 (1H, s), 7.20 (1H, d), 3.87 (3H, s), 3.67 (3H, s), 3.58 (2H, s), 2.54 (3H, s), 2.41 (3H, s).

Reference Preparation Example 3

A mixture of the Intermediate compound 5 (1.8 g), hydroxylamine hydrochloride (0.7 g), pyridine (1.4 mL), and ethanol (20 mL) was stirred at room temperature for 4 hours. To the resulting mixture was added 1N hydrochloric acid, and the resulting mixture was extracted with ethyl acetate. The resulting organic layer was dried over anhydrous magnesium sulfate, and concentrated under reduced pressure to give the Intermediate compound 6 represented by the following formula (1.7 g).

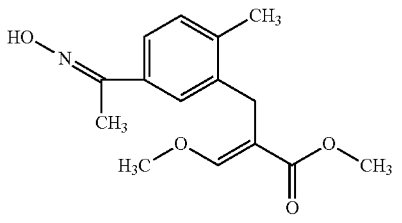 [SMILES: CO/C=C(\Cc1cc(C(C)=NO)ccc1C)C(=O)OC]

Intermediate compound 6: $^1$H-NMR ($CDCl_3$) δ: 7.48 (1H, s), 7.39 (1H, d), 7.33 (1H, dd), 7.12 (1H, d), 3.85 (3H, s), 3.67 (3H, s), 3.56 (2H, s), 2.36 (3H, s), 2.23 (3H, s).

Preparation Example 1

To a mixture of the Intermediate compound 3 (0.40 g) and THF (10 mL) was added butyllithium (2.6 M solution in hexane) (1.25 mL) at 0° C., and the resulting mixture was stirred for 1 hour. To the resulting mixture was added iodomethane (0.21 mL) at 0° C., and the resulting mixture was stirred for 2 hours. To the resulting mixture was added a saturated ammonium chloride aqueous solution, and the resulting mixture was extracted with ethyl acetate. The resulting organic layer was dried over anhydrous magnesium sulfate, and concentrated under reduced pressure. The resulting residue was subjected to silica gel column chromatography (ethyl acetate:hexane=1:9) to give the Present compound A17 represented by the following formula (0.04 g).

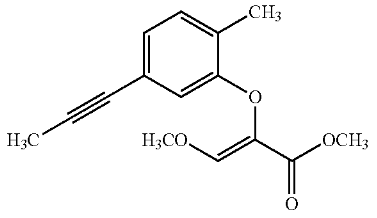 [SMILES: CC#Cc1ccc(C)c(O/C(=C\OC)C(=O)OC)c1]

Present compound A17: $^1$H-NMR ($CDCl_3$) δ: 7.31 (1H, s), 7.06 (1H, d), 6.95 (1H, d), 6.75 (1H, s), 3.87 (3H, s), 3.70 (3H, s), 2.32 (3H, s), 2.02 (3H, s).

Preparation Example 2

A mixture of the Intermediate compound 1 (0.50 g), 3-methyl-1-butyne (0.68 mL), $PdCl_2(PPh_3)_2$ (0.06 g), tetrabutylammonium fluoride (1 M solution in tetrahydrofuran) (5.0 mL), and THF (5 mL) was stirred at 80° C. for 7 hours. After the resulting mixture was cooled to room temperature, a saturated sodium hydrogen carbonate aqueous solution was added thereto, and the resulting mixture was extracted with ethyl acetate. The resulting organic layer was dried over anhydrous magnesium sulfate, and concentrated under reduced pressure. The resulting residue was subjected to silica gel column chromatography (ethyl acetate:hexane=1:9) to give the Present compound A20 represented by the following formula (0.26 g).

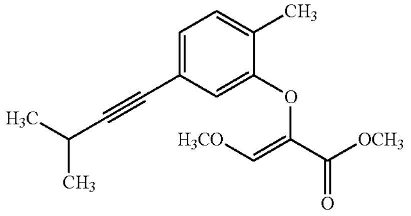 [SMILES: CO/C=C(\Oc1cc(C#CC(C)C)ccc1C)C(=O)OC]

Present compound A20: $^1$H-NMR ($CDCl_3$) δ: 7.32 (1H, s), 7.05 (1H, d), 6.95 (1H, d), 6.73 (1H, s), 3.07 (3H, s), 3.70 (3H, s), 2.80-2.69 (1H, m), 2.32 (3H, s), 1.24 (6H, d).

Preparation Example 2-1

The compound prepared according to the Preparation Example 2 and the physical property thereof are shown below.

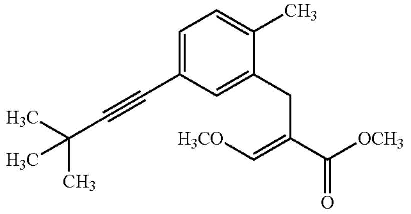 [SMILES: CO/C=C(\Cc1cc(C#CC(C)(C)C)ccc1C)C(=O)OC]

Present compound A8: $^1$H-NMR ($CDCl_3$) δ: 7.48 (1H, s), 7.11-7.06 (2H, m), 7.00 (1H, d), 3.84 (3H, s), 3.66 (3H, s), 3.49 (2H, s), 2.31 (3H, s), 1.30 (9H, s).

Preparation Example 3

To a mixture of the Intermediate compound 6 (0.30 g), 1-iodopropane (0.16 mL), and acetonitrile (5 mL) was added sodium hydride (60%, oily) (0.06 g), and the resulting mixture was stirred at room temperature. To the resulting mixture was added water, and the resulting mixture was extracted with ethyl acetate. The resulting organic layer was washed with saturated brine, dried over anhydrous sodium sulfate, and concentrated under reduced pressure. The resulting residue was subjected to silica gel column chromatography to give the Present compound A52 represented by the following formula (0.16 g).

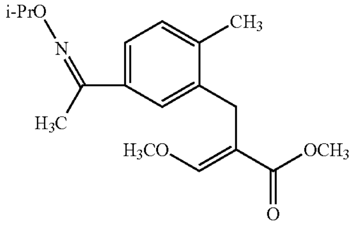

Present compound A52: $^1$H-NMR ($CDCl_3$) δ: 7.46 (1H, s), 7.41 (1H, d), 7.37 (1H, d), 7.09 (1H, d), 4.47-4.37 (1H, m), 3.85 (3H, s), 3.66 (3H, s), 3.56 (2H, s), 2.35 (3H, s), 2.16 (3H, s), 1.29 (6H, d).

Preparation Example 3-1

The compounds prepared according to the Preparation Example 3 and the physical properties thereof are shown below.

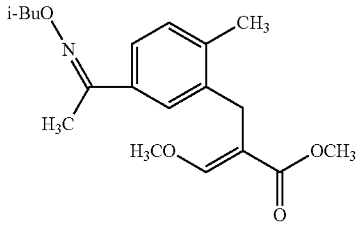

Present compound A54: $^1$H-NMR ($CDCl_3$) δ: 7.46 (1H, s), 7.39-7.34 (2H, m), 7.09 (1H, d), 3.94 (2H, d), 3.85 (3H, s), 3.66 (3H, s), 3.56 (2H, s), 2.35 (3H, s), 2.18 (3H, s), 2.10-2.00 (1H, m), 0.96 (6H, d).

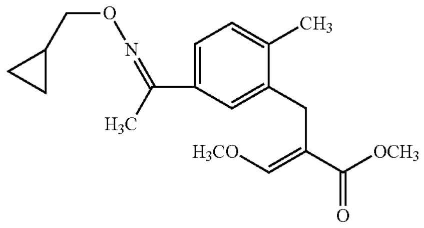 [SMILES: CO/C=C(\Cc1cc(C(C)=NOCC2CC2)ccc1C)C(=O)OC]

Present compound A61: $^1$H-NMR ($CDCl_3$) δ: 7.47 (1H, s), 7.40 (1H, s), 7.36 (1H, d), 7.09 (1H, d), 3.98 (2H, d), 3.85 (3H, s), 3.66 (3H, s), 3.56 (2H, s), 2.35 (3H, s), 2.20 (3H, s), 1.22-1.18 (1H, m), 0.58-0.53 (2H, m), 0.34-0.30 (2H, m).

Preparation Example 4

A mixture of the Intermediate compound 1 (0.50 g), 2-fluorophenylboronic acid (0.28 g), [1,1'-bis(diphenylphosphino)ferrocene]palladium(II) dichloride (0.11 g), tripotassium phosphate (0.85 g), dimethoxyethane (15 mL), and water (1 mL) was stirred at 80° C. for 5 hours. The resulting mixture was cooled to room temperature, and then filtered. The resulting filtrate was dried over anhydrous magnesium sulfate, and concentrated under reduced pressure. The resulting residue was subjected to silica gel column chromatography (ethyl acetate:hexane=1:4) to give the Present compound A152 represented by the following formula (0.42 g).

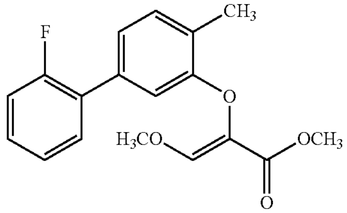

Present compound A152: $^1$H-NMR ($CDCl_3$) δ: 7.41-7.35 (1H, m), 7.33 (1H, s), 7.31-7.07 (5H, m), 6.93-6.91 (1H, m), 3.87 (3H, s), 3.71 (3H, s), 2.40 (3H, s).

Preparation Example 4-1

The compounds prepared according to the Preparation Example 4 and the physical properties thereof are shown below.

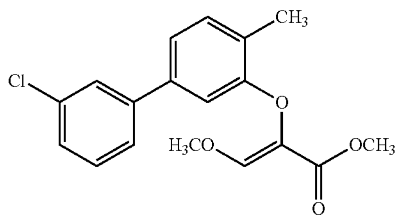 [SMILES: CO/C=C(\Oc1cc(-c2cccc(Cl)c2)ccc1C)C(=O)OC]

Present compound A156: $^1$H-NMR ($CDCl_3$) δ: 7.50 (1H, t), 7.42-7.30 (4H, m), 7.27-7.24 (1H, m), 7.13 (1H, dd), 6.90 (1H, d), 3.92 (3H, s), 3.75 (3H, s), 2.42 (3H, s).

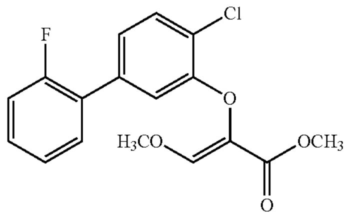 [SMILES: CO/C=C(\Oc1cc(-c2ccccc2F)ccc1Cl)C(=O)OC]

Present compound A165: $^1$H-NMR ($CDCl_3$) δ: 7.46-7.28 (4H, m), 7.22-7.09 (3H, m), 7.01-6.98 (1H, m), 3.88 (3H, s), 3.73 (3H, s).

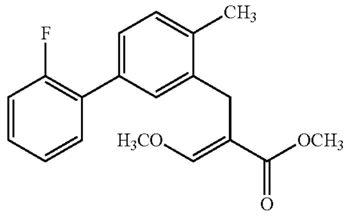 [SMILES: CO/C=C(\Cc1cc(-c2ccccc2F)ccc1C)C(=O)OC]

Present compound A126: $^1$H-NMR ($CDCl_3$) δ: 7.48 (1H, s), 7.39 (1H, t), 7.31-7.23 (3H, m), 7.21-7.06 (3H, m), 3.84 (3H, s), 3.67 (3H, s), 3.60 (2H, s), 2.39 (3H, s).

Next, Examples of the Present compound A prepared according to any one of the Preparation Examples described in EXAMPLES and the Production methods described in the present description are shown below.

A compound represented by formula (IA)

(IA)

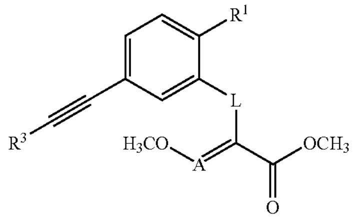

wherein the combination of $R^1$, $R^3$, A, and L represents any one combination indicated in Table 1 or Table 2.

TABLE 1

| Present compound A | $R^1$ | $R^3$ | A | L |
|---|---|---|---|---|
| A1 | Me | Me | CH | $CH_2$ |
| A2 | Me | Et | CH | $CH_2$ |
| A3 | Me | Pr | CH | $CH_2$ |
| A4 | Me | i-Pr | CH | $CH_2$ |
| A5 | Me | Bu | CH | $CH_2$ |
| A6 | Me | i-Bu | CH | $CH_2$ |
| A7 | Me | s-Bu | CH | $CH_2$ |
| A8 | Me | t-Bu | CH | $CH_2$ |
| A9 | Cl | Me | CH | $CH_2$ |
| A10 | Cl | Et | CH | $CH_2$ |
| A11 | Cl | Pr | CH | $CH_2$ |
| A12 | Cl | i-Pr | CH | $CH_2$ |
| A13 | Cl | Bu | CH | $CH_2$ |
| A14 | Cl | i-Bu | CH | $CH_2$ |
| A15 | Cl | s-Bu | CH | $CH_2$ |
| A16 | Cl | t-Bu | CH | $CH_2$ |
| A17 | Me | Me | CH | O |
| A18 | Me | Et | CH | O |
| A19 | Me | Pr | CH | O |
| A20 | Me | i-Pr | CH | O |
| A21 | Me | Bu | CH | O |
| A22 | Me | i-Bu | CH | O |
| A23 | Me | s-Bu | CH | O |
| A24 | Me | t-Bu | CH | O |
| A25 | Cl | Me | CH | O |

TABLE 2

| Present compound A | $R^1$ | $R^3$ | A | L |
|---|---|---|---|---|
| A26 | Cl | Et | CH | O |
| A27 | Cl | Pr | CH | O |
| A28 | Cl | i-Pr | CH | O |
| A29 | Cl | Bu | CH | O |
| A30 | Cl | i-Bu | CH | O |
| A31 | Cl | s-Bu | CH | O |
| A32 | Cl | t-Bu | CH | O |
| A33 | Me | Me | N | $CH_2$ |
| A34 | Me | Et | N | $CH_2$ |
| A35 | Me | Pr | N | $CH_2$ |
| A36 | Me | i-Pr | N | $CH_2$ |
| A37 | Me | Bu | N | $CH_2$ |
| A38 | Me | i-Bu | N | $CH_2$ |
| A39 | Me | s-Bu | N | $CH_2$ |
| A40 | Me | t-Bu | N | $CH_2$ |
| A41 | Cl | Me | N | $CH_2$ |
| A42 | Cl | Et | N | $CH_2$ |
| A43 | Cl | Pr | N | $CH_2$ |
| A44 | Cl | i-Pr | N | $CH_2$ |
| A45 | Cl | Bu | N | $CH_2$ |
| A46 | Cl | i-Bu | N | $CH_2$ |
| A47 | Cl | s-Bu | N | $CH_2$ |
| A48 | Cl | t-Bu | N | $CH_2$ |

A compound represented by formula (IB)

(IB)

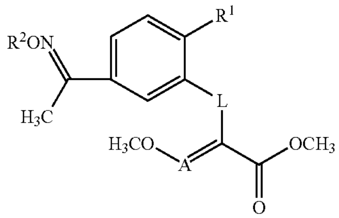

wherein the combination of $R^1$, $R^2$, A, and L represents any one combination indicated in Table 3 to Table 5.

TABLE 3

| Present compound A | $R^1$ | $R^2$ | A | L |
|---|---|---|---|---|
| A49 | Me | Me | CH | $CH_2$ |
| A50 | Me | Et | CH | $CH_2$ |
| A51 | Me | Pr | CH | $CH_2$ |
| A52 | Me | i-Pr | CH | $CH_2$ |
| A53 | Me | Bu | CH | $CH_2$ |
| A54 | Me | i-Bu | CH | $CH_2$ |
| A55 | Me | s-Bu | CH | $CH_2$ |
| A56 | Me | t-Bu | CH | $CH_2$ |
| A57 | Me | $CH_2Ph$ | CH | $CH_2$ |
| A58 | Me | $CH_2$ (2-Me-Ph) | CH | $CH_2$ |
| A59 | Me | $CH_2$ (3-Me-Ph) | CH | $CH_2$ |
| A60 | Me | $CH_2$ (4-Me-Ph) | CH | $CH_2$ |
| A61 | Me | $CH_2$c-Pr | CH | $CH_2$ |
| A62 | Cl | Me | CH | $CH_2$ |
| A63 | Cl | Et | CH | $CH_2$ |
| A64 | Cl | Pr | CH | $CH_2$ |
| A65 | Cl | i-Pr | CH | $CH_2$ |
| A66 | Cl | Bu | CH | $CH_2$ |
| A67 | Cl | i-Bu | CH | $CH_2$ |
| A68 | Cl | s-Bu | CH | $CH_2$ |
| A69 | Cl | t-Bu | CH | $CH_2$ |
| A70 | Cl | $CH_2Ph$ | CH | $CH_2$ |
| A71 | Cl | $CH_2$ (2-Me-Ph) | CH | $CH_2$ |
| A72 | Cl | $CH_2$ (3-Me-Ph) | CH | $CH_2$ |
| A73 | Cl | $CH_2$ (4-Me-Ph) | CH | $CH_2$ |
| A74 | Cl | $CH_2$c-Pr | CH | $CH_2$ |

TABLE 4

| Present compound A | $R^1$ | $R^2$ | A | L |
|---|---|---|---|---|
| A75 | Me | Me | CH | O |
| A76 | Me | Et | CH | O |
| A77 | Me | Pr | CH | O |
| A78 | Me | i-Pr | CH | O |
| A79 | Me | Bu | CH | O |
| A80 | Me | i-Bu | CH | O |
| A81 | Me | s-Bu | CH | O |
| A82 | Me | t-Bu | CH | O |
| A83 | Me | $CH_2Ph$ | CH | O |
| A84 | Me | $CH_2$ (2-Me-Ph) | CH | O |
| A85 | Me | $CH_2$ (3-Me-Ph) | CH | O |
| A86 | Me | $CH_2$ (4-Me-Ph) | CH | O |
| A87 | Me | $CH_2$c-Pr | CH | O |
| A88 | Cl | Me | CH | O |
| A89 | Cl | Et | CH | O |
| A90 | Cl | Pr | CH | O |
| A91 | Cl | i-Pr | CH | O |
| A92 | Cl | Bu | CH | O |
| A93 | Cl | i-Bu | CH | O |
| A94 | Cl | s-Bu | CH | O |
| A95 | Cl | t-Bu | CH | O |
| A96 | Cl | $CH_2Ph$ | CH | O |
| A97 | Cl | $CH_2$ (2-Me-Ph) | CH | O |
| A98 | Cl | $CH_2$ (3-Me-Ph) | CH | O |
| A99 | Cl | $CH_2$ (4-Me-Ph) | CH | O |
| A100 | Cl | $CH_2$c-Pr | CH | O |

TABLE 5

| Present compound A | $R^1$ | $R^2$ | A | L |
|---|---|---|---|---|
| A101 | Me | Me | N | $CH_2$ |
| A102 | Me | Et | N | $CH_2$ |
| A103 | Me | Pr | N | $CH_2$ |
| A104 | Me | i-Pr | N | $CH_2$ |
| A105 | Me | Bu | N | $CH_2$ |
| A106 | Me | i-Bu | N | $CH_2$ |
| A107 | Me | s-Bu | N | $CH_2$ |
| A108 | Me | t-Bu | N | $CH_2$ |
| A109 | Me | $CH_2Ph$ | N | $CH_2$ |
| A110 | Me | $CH_2$ (2-Me-Ph) | N | $CH_2$ |
| A111 | Me | $CH_2$ (3-Me-Ph) | N | $CH_2$ |
| A112 | Me | $CH_2$ (4-Me-Ph) | N | $CH_2$ |
| A113 | Me | $CH_2$c-Pr | N | $CH_2$ |
| A114 | Cl | Me | N | $CH_2$ |
| A115 | Cl | Et | N | $CH_2$ |
| A116 | Cl | Pr | N | $CH_2$ |
| A117 | Cl | i-Pr | N | $CH_2$ |
| A118 | Cl | Bu | N | $CH_2$ |
| A119 | Cl | i-Bu | N | $CH_2$ |
| A118-1 | Cl | s-Bu | N | $CH_2$ |
| A119-1 | Cl | t-Bu | N | $CH_2$ |
| A120 | Cl | $CH_2Ph$ | N | $CH_2$ |
| A121 | Cl | $CH_2$ (2-Me-Ph) | N | $CH_2$ |
| A122 | Cl | $CH_2$ (3-Me-Ph) | N | $CH_2$ |
| A123 | Cl | $CH_2$ (4-Me-Ph) | N | $CH_2$ |
| A124 | Cl | $CH_2$c-Pr | N | $CH_2$ |

A compound represented by formula (IC)

(IC)

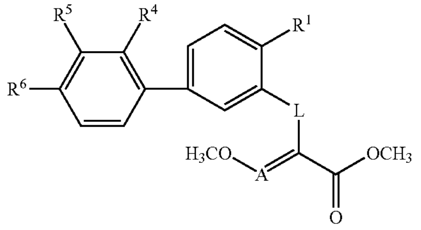

wherein the combination of $R^1$, $R^4$, $R^5$, $R^6$, A, and L represents any one combination indicated in Table 6 to Table 8.

TABLE 6

| Present compound A | $R^1$ | $R^4$ | $R^5$ | $R^6$ | A | L |
|---|---|---|---|---|---|---|
| A125 | Me | H | H | H | CH | $CH_2$ |
| A126 | Me | F | H | H | CH | $CH_2$ |
| A127 | Me | H | F | H | CH | $CH_2$ |
| A128 | Me | H | H | F | CH | $CH_2$ |
| A129 | Me | Cl | H | H | CH | $CH_2$ |
| A130 | Me | H | Cl | H | CH | $CH_2$ |
| A131 | Me | H | H | Cl | CH | $CH_2$ |
| A132 | Me | Br | H | H | CH | $CH_2$ |
| A133 | Me | H | Br | H | CH | $CH_2$ |
| A134 | Me | H | H | Br | CH | $CH_2$ |
| A135 | Me | I | H | H | CH | $CH_2$ |
| A136 | Me | H | I | H | CH | $CH_2$ |
| A137 | Me | H | H | I | CH | $CH_2$ |
| A138 | Cl | H | H | H | CH | $CH_2$ |
| A139 | Cl | F | H | H | CH | $CH_2$ |
| A140 | Cl | H | F | H | CH | $CH_2$ |
| A141 | Cl | H | H | F | CH | $CH_2$ |
| A142 | Cl | Cl | H | H | CH | $CH_2$ |
| A143 | Cl | H | Cl | H | CH | $CH_2$ |
| A144 | Cl | H | H | Cl | CH | $CH_2$ |
| A145 | Cl | Br | H | H | CH | $CH_2$ |
| A146 | Cl | H | Br | H | CH | $CH_2$ |
| A147 | Cl | H | H | Br | CH | $CH_2$ |
| A148 | Cl | I | H | H | CH | $CH_2$ |
| A149 | Cl | H | I | H | CH | $CH_2$ |
| A150 | Cl | H | H | I | CH | $CH_2$ |

TABLE 7

| Present compound A | $R^1$ | $R^4$ | $R^5$ | $R^6$ | A | L |
|---|---|---|---|---|---|---|
| A151 | Me | H | H | H | CH | O |
| A152 | Me | F | H | H | CH | O |
| A153 | Me | H | F | H | CH | O |
| A154 | Me | H | H | F | CH | O |
| A155 | Me | Cl | H | H | CH | O |
| A156 | Me | H | Cl | H | CH | O |
| A157 | Me | H | H | Cl | CH | O |
| A158 | Me | Br | H | H | CH | O |
| A159 | Me | H | Br | H | CH | O |
| A160 | Me | H | H | Br | CH | O |
| A161 | Me | I | H | H | CH | O |
| A162 | Me | H | I | H | CH | O |
| A163 | Me | H | H | I | CH | O |
| A164 | Cl | H | H | H | CH | O |
| A165 | Cl | F | H | H | CH | O |
| A166 | Cl | H | F | H | CH | O |
| A167 | Cl | H | H | F | CH | O |
| A168 | Cl | Cl | H | H | CH | O |
| A169 | Cl | H | Cl | H | CH | O |
| A170 | Cl | H | H | Cl | CH | O |
| A171 | Cl | Br | H | H | CH | O |
| A172 | Cl | H | Br | H | CH | O |
| A173 | Cl | H | H | Br | CH | O |
| A174 | Cl | I | H | H | CH | O |
| A175 | Cl | H | I | H | CH | O |
| A176 | Cl | H | H | I | CH | O |

TABLE 8

| Present compound A | $R^1$ | $R^4$ | $R^5$ | $R^6$ | A | L |
|---|---|---|---|---|---|---|
| A177 | Me | H | H | H | N | $CH_2$ |
| A178 | Me | F | H | H | N | $CH_2$ |
| A179 | Me | H | F | H | N | $CH_2$ |
| A180 | Me | H | H | F | N | $CH_2$ |
| A181 | Me | Cl | H | H | N | $CH_2$ |
| A182 | Me | H | Cl | H | N | $CH_2$ |
| A183 | Me | H | H | Cl | N | $CH_2$ |
| A184 | Me | Br | H | H | N | $CH_2$ |
| A185 | Me | H | Br | H | N | $CH_2$ |
| A186 | Me | H | H | Br | N | $CH_2$ |
| A187 | Me | I | H | H | N | $CH_2$ |
| A188 | Me | H | I | H | N | $CH_2$ |
| A189 | Me | H | H | I | N | $CH_2$ |
| A190 | Cl | H | H | H | N | $CH_2$ |
| A191 | Cl | F | H | H | N | $CH_2$ |
| A192 | Cl | H | F | H | N | $CH_2$ |
| A193 | Cl | H | H | F | N | $CH_2$ |
| A194 | Cl | Cl | H | H | N | $CH_2$ |
| A195 | Cl | H | Cl | H | N | $CH_2$ |
| A196 | Cl | H | H | Cl | N | $CH_2$ |
| A197 | Cl | Br | H | H | N | $CH_2$ |
| A198 | Cl | H | Br | H | N | $CH_2$ |
| A199 | Cl | H | H | Br | N | $CH_2$ |
| A200 | Cl | I | H | H | N | $CH_2$ |
| A201 | Cl | H | I | H | N | $CH_2$ |
| A202 | Cl | H | H | I | N | $CH_2$ |

Specific examples of the Present composition are shown below. The expression of "Present compound S" represents the Present compound A1 to the Present compound A202.

Composition group MX1: A composition for controlling a plant disease comprising any one of the Present compound S and prothioconazole at the weight ratio of 0.1:1;

Composition group MX2: A composition for controlling a plant disease comprising any one of the Present compound S and prothioconazole at the weight ratio of 1:1;

Composition group MX3: A composition for controlling a plant disease comprising any one of the Present compound S and prothioconazole at the weight ratio of 10:1;

Composition group MX4: A composition for controlling a plant disease comprising any one of the Present compound S and mefentrifluconazole at the weight ratio of 0.1:1;

Composition group MX5: A composition for controlling a plant disease comprising any one of the Present compound S and mefentrifluconazole at the weight ratio of 1:1; and Composition group MX6: A composition for controlling a plant disease comprising any one of the Present compound S and mefentrifluconazole at the weight ratio of 10:1.

Next, Formulation Examples are shown below. The "part(s)" represents "part(s) by weight". Also, the expression of "Composition MX" represents the compositions described in the Composition group MX1 to the Composition group MX6.

Formulation Example 1

Any one composition of the Composition MX (50 parts), calcium lignin sulfonate (3 parts), magnesium lauryl sulfate (2 parts), and wet silica (45 parts) are fully ground and mixed to obtain each formulation.

Formulation Example 2

Any one composition of the Composition MX (20 parts) and sorbitan trioleate (1.5 parts) are mixed with an aqueous solution (28.5 parts) comprising polyvinyl alcohol (2 parts), the resulting mixture is subjected to fine grinding according to a wet grinding method, then an aqueous solution (40 parts) comprising xanthan gum (0.05 part) and aluminum magnesium silicate (0.1 part) is added thereto, propylene glycol (10 parts) is added thereto, and the resulting mixture is mixed with stirring to obtain each formulation.

Formulation Example 3

Any one composition of the Composition MX (2 parts), kaolin clay (88 parts), and talc (10 parts) are fully ground and mixed to obtain each formulation.

Formulation Example 4

Any one composition of the Composition MX (5 parts), polyoxyethylene styryl phenyl ether (14 parts), calcium dodecylbenzene sulfonate (6 parts), and xylene (75 parts) are fully mixed to obtain each formulation.

Formulation Example 5

Any one composition of the Composition MX (2 parts), wet silica (1 part), calcium lignin sulfonate (2 parts), bentonite (30 parts), and kaolin clay (65 parts) are fully ground and mixed, then water is added thereto, the resulting mixture is fully kneaded, and subjected to dry granulation to obtain each formulation.

Formulation Example 6

A mixture of polyoxyethylene alkyl ether sulfate ammonium salt and wet silica (weight ratio of 1:1) (35 parts), any one composition of the Composition MX (20 parts), and water (45 parts) are thoroughly mixed to obtain each formulation.

Next, Test Examples are shown to illustrate that the Present compositions are useful for controlling plant diseases.

Test Example 1: Test for Controlling Soybean Rust (*Phakopsora pachyrhizi*)

Soybean leaf (cv; Kurosengoku) was punched out to 1 cm diameter to prepare a leaf disk. Each 1 mL of an agar medium (agar concentration 1.2%) was dispensed in each well of 24 well microplate. A piece of the leaf disk was placed on agar medium on each well. To a mixture of 1 μL of Sorpol (registered trademark) 1200KX, 4.5 μL of DMSO, and 5 μL of xylene were added 20 μL of a DMSO solution containing a predetermined concentration of any one of the compound selected from the present compound S and 20 μL of a DMSO solution containing a predetermined concentration of the present compound B, and the solutions were mixed.

The resulting mixture was diluted with ion exchange water to prepare an agent solution containing a predetermined concentration of the test compound. The resulting agent solution was sprayed in 10 μL per one leaf disk. After 1 day, an aqueous suspension of conidia of *Phakopsora pachyrhizi* ($1.0\times10^5$/mL) was inoculated onto the leaf disks. After the inoculation, the microplate was placed in a growth chamber (light on for 6 hours, light off for 18 hours, 23° C. temperature, 60% humidity). After 1 day, the leaf disks were air-dried to disappear water droplets on the surface of the leaf disk, and the microplate was placed again in the growth chamber for 12 days (which was “treated area”). Thereafter, a lesion area of soybean rust disease was assessed.

Control effect was calculated by the following “Equation 1” from the ratio of the lesion area of the incidence of disease in the treated area and the ratio of the lesion area of the incidence of disease in the non-treated area.

$$\text{Control effect}=100\times(X-Y)/X \qquad \text{“Equation 1”}$$

X: Ratio of the lesion area of the incidence of disease in the non-treated area

Y: Ratio of the lesion area of the incidence of disease in the treated area

Here the non-treated area represents an area wherein the same procedures are taken except for using the present compound S and the present compound B.

The results are shown in Table 9 and Table 10.

TABLE 9

| Present composition | Concentration (ppm) | Control effect |
|---|---|---|
| Present compound A8 + prothioconazole | 5 + 5 | 100 |
| Present compound A8 + prothioconazole | 5 + 50 | 100 |
| Present compound A8 + prothioconazole | 50 + 5 | 100 |
| Present compound A24 + prothioconazole | 5 + 5 | 100 |
| Present compound A24 + prothioconazole | 5 + 50 | 100 |
| Present compound A24 + prothioconazole | 50 + 5 | 100 |
| Present compound A32 + prothioconazole | 5 + 5 | 100 |
| Present compound A32 + prothioconazole | 5 + 50 | 100 |
| Present compound A32 + prothioconazole | 50 + 5 | 100 |
| Present compound A40 + prothioconazole | 5 + 5 | 100 |
| Present compound A40 + prothioconazole | 5 + 50 | 100 |
| Present compound A40 + prothioconazole | 50 + 5 | 100 |
| Present compound A52 + prothioconazole | 5 + 5 | 100 |
| Present compound A52 + prothioconazole | 5 + 50 | 100 |
| Present compound A52 + prothioconazole | 50 + 5 | 100 |
| Present compound A54 + prothioconazole | 5 + 5 | 100 |
| Present compound A54 + prothioconazole | 5 + 50 | 100 |
| Present compound A54 + prothioconazole | 50 + 5 | 100 |
| Present compound A61 + prothioconazole | 5 + 5 | 100 |
| Present compound A61 + prothioconazole | 5 + 50 | 100 |
| Present compound A61 + prothioconazole | 50 + 5 | 100 |
| Present compound A78 + prothioconazole | 5 + 5 | 100 |
| Present compound A78 + prothioconazole | 5 + 50 | 100 |

TABLE 9-continued

| Present composition | Concentration (ppm) | Control effect |
|---|---|---|
| Present compound A78 + prothioconazole | 50 + 5 | 100 |
| Present compound A83 + prothioconazole | 5 + 5 | 100 |
| Present compound A83 + prothioconazole | 5 + 50 | 100 |
| Present compound A83 + prothioconazole | 50 + 5 | 100 |

TABLE 10

| Present composition | Concentration (ppm) | Control effect |
|---|---|---|
| Present compound A84 + prothioconazole | 5 + 5 | 100 |
| Present compound A84 + prothioconazole | 5 + 50 | 100 |
| Present compound A84 + prothioconazole | 50 + 5 | 100 |
| Present compound A85 + prothioconazole | 5 + 5 | 100 |
| Present compound A85 + prothioconazole | 5 + 50 | 100 |
| Present compound A85 + prothioconazole | 50 + 5 | 100 |
| Present compound A125 + prothioconazole | 5 + 5 | 100 |
| Present compound A125 + prothioconazole | 5 + 50 | 100 |
| Present compound A125 + prothioconazole | 50 + 5 | 100 |
| Present compound A126 + prothioconazole | 5 + 5 | 100 |
| Present compound A126 + prothioconazole | 5 + 50 | 100 |
| Present compound A126 + prothioconazole | 50 + 5 | 100 |
| Present compound A130 + prothioconazole | 5 + 5 | 100 |
| Present compound A130 + prothioconazole | 5 + 50 | 100 |
| Present compound A130 + prothioconazole | 50 + 5 | 100 |
| Present compound A151 + prothioconazole | 5 + 5 | 100 |
| Present compound A151 + prothioconazole | 5 + 50 | 100 |
| Present compound A151 + prothioconazole | 50 + 5 | 100 |
| Present compound A152 + prothioconazole | 5 + 5 | 100 |
| Present compound A152 + prothioconazole | 5 + 50 | 100 |
| Present compound A152 + prothioconazole | 50 + 5 | 100 |
| Present compound A154 + prothioconazole | 5 + 5 | 100 |
| Present compound A154 + prothioconazole | 5 + 50 | 100 |
| Present compound A154 + prothioconazole | 50 + 5 | 100 |
| Present compound A156 + prothioconazole | 5 + 5 | 100 |
| Present compound A156 + prothioconazole | 5 + 50 | 100 |
| Present compound A156 + prothioconazole | 50 + 5 | 100 |
| Present compound A165 + prothioconazole | 5 + 5 | 100 |
| Present compound A165 + prothioconazole | 5 + 50 | 100 |
| Present compound A165 + prothioconazole | 50 + 5 | 100 |

Test Example 2: Test for Controlling Wheat Leaf Blotch (*Septoria tritici*)

Each of any one of the compound selected from the present compound S and the present compound B were diluted with DMSO so as to contain a predetermined concentration thereof, and 1 μL of the dilution mixtures were dispensed into titer plate (96 well), and thereafter, thereto was then dispensed 150 μL of a potato dextrose broth (PDB broth) to which conidia of *Septoria tritici* were inoculated in advance. This plate was cultured at 18° C. for 4 days, thereby allowing *Septoria tritici* to undergo proliferation, and the absorbance at 550 nm of each well of the titer plate was then measured to determine a degree of growth of *Septoria tritici* (which was “treated area”).

Control effect was calculated by the following “Equation 2” from the degree of growth.

$$\text{Control effect}=100\times(X-Y)/X \qquad \text{“Equation 2”}$$

X: Degree of growth of fungus in the non-treated area

Y: Degree of growth of fungus in the treated area

Here the non-treated area represents an area wherein the same procedures are taken except for using the present compound S and the present compound B.

The results are shown in Table 11 and Table 12.

TABLE 11

| Present composition | Concentration (ppm) | Control effect |
|---|---|---|
| Present compound A8 + metentrifluconazole | 0.04 + 0.04 | 100 |
| Present compound A8 + mefentrifluconazole | 0.008 + 0.04 | 100 |
| Present compound A8 + mefentrifluconazole | 0.04 + 0.008 | 100 |
| Present compound A24 + mefentrifluconazole | 0.04 + 0.04 | 100 |
| Present compound A24 + mefentrifluconazole | 0.008 + 0.04 | 100 |
| Present compound A24 + mefentrifluconazole | 0.04 + 0.008 | 100 |
| Present compound A32 + mefentrifluconazole | 0.04 + 0.04 | 100 |
| Present compound A32 + mefentrifluconazole | 0.008 + 0.04 | 100 |
| Present compound A32 + mefentrifluconazole | 0.04 + 0.008 | 100 |
| Present compound A40 + mefentrifluconazole | 0.04 + 0.04 | 100 |
| Present compound A40 + mefentrifluconazole | 0.008 + 0.04 | 100 |
| Present compound A40 + mefentrifluconazole | 0.04 + 0.008 | 100 |
| Present compound A52 + mefentrifluconazole | 0.04 + 0.04 | 100 |
| Present compound A52 + mefentrifluconazole | 0.008 + 0.04 | 100 |
| Present compound A52 + mefentrifluconazole | 0.04 + 0.008 | 100 |
| Present compound A54 + mefentrifluconazole | 0.04 + 0.04 | 100 |
| Present compound A54 + mefentrifluconazole | 0.008 + 0.04 | 100 |
| Present compound A54 + mefentrifluconazole | 0.04 + 0.008 | 100 |
| Present compound A61 + mefentrifluconazole | 0.04 + 0.04 | 100 |
| Present compound A61 + mefentrifluconazole | 0.008 + 0.04 | 100 |
| Present compound A61 + metentrifluconazole | 0.04 + 0.008 | 100 |
| Present compound A78 + mefentrifluconazole | 0.04 + 0.04 | 100 |
| Present compound A78 + mefentrifluconazole | 0.008 + 0.04 | 100 |
| Present compound A78 + mefentrifluconazole | 0.04 + 0.008 | 100 |
| Present compound A83 + mefentrifluconazole | 0.04 + 0.04 | 100 |
| Present compound A83 + mefentrifluconazole | 0.008 + 0.04 | 100 |
| Present compound A83 + mefentrifluconazole | 0.04 + 0.008 | 100 |

TABLE 12

| Present composition | Concentration (ppm) | Control effect |
|---|---|---|
| Present compound A84 + metentrifluconazole | 0.04 + 0.04 | 100 |
| Present compound A84 + mefentrifluconazole | 0.008 + 0.04 | 100 |
| Present compound A84 + mefentrifluconazole | 0.04 + 0.008 | 100 |
| Present compound A85 + mefentrifluconazole | 0.04 + 0.04 | 100 |
| Present compound A85 + mefentrifluconazole | 0.008 + 0.04 | 100 |
| Present compound A85 + mefentrifluconazole | 0.04 + 0.008 | 100 |
| Present compound A125 + mefentrifluconazole | 0.04 + 0.04 | 100 |

TABLE 12-continued

| Present composition | Concentration (ppm) | Control effect |
|---|---|---|
| Present compound A125 + mefentrifluconazole | 0.008 + 0.04 | 100 |
| Present compound A125 + mefentrifluconazole | 0.04 + 0.008 | 100 |
| Present compound A126 + mefentrifluconazole | 0.04 + 0.04 | 100 |
| Present compound A126 + mefentrifluconazole | 0.008 + 0.04 | 100 |
| Present compound A126 + mefentrifluconazole | 0.04 + 0.008 | 100 |
| Present compound A130 + mefentrifluconazole | 0.04 + 0.04 | 100 |
| Present compound A130 + mefentrifluconazole | 0.008 + 0.04 | 100 |
| Present compound A130 + mefentrifluconazole | 0.04 + 0.008 | 100 |
| Present compound A151 + mefentrifluconazole | 0.04 + 0.04 | 100 |
| Present compound A151 + mefentrifluconazole | 0.008 + 0.04 | 100 |
| Present compound A151 + mefentrifluconazole | 0.04 + 0.008 | 100 |
| Present compound A152 + mefentrifluconazole | 0.04 + 0.04 | 100 |
| Present compound A152 + mefentrifluconazole | 0.008 + 0.04 | 100 |
| Present compound A152 + metentrifluconazole | 0.04 + 0.008 | 100 |
| Present compound A154 + mefentrifluconazole | 0.04 + 0.04 | 100 |
| Present compound A154 + mefentrifluconazole | 0.008 + 0.04 | 100 |
| Present compound A154 + mefentrifluconazole | 0.04 + 0.008 | 100 |
| Present compound A156 + mefentrifluconazole | 0.04 + 0.04 | 100 |
| Present compound A156 + mefentrifluconazole | 0.008 + 0.04 | 100 |
| Present compound A156 + mefentrifluconazole | 0.04 + 0.008 | 100 |
| Present compound A165 + mefentrifluconazole | 0.04 + 0.04 | 100 |
| Present compound A165 + mefentrifluconazole | 0.008 + 0.04 | 100 |
| Present compound A165 + mefentrifluconazole | 0.04 + 0.008 | 100 |

INDUSTRIAL APPLICABILITY

The composition for controlling plant diseases of the present invention can control plant diseases.

The invention claimed is:

1. A composition for controlling a plant disease, comprising:

a compound represented by formula (I); and at least one sterol biosynthetic enzyme inhibitor selected from the group consisting of prothioconazole and mefentrifluconazole, (I)

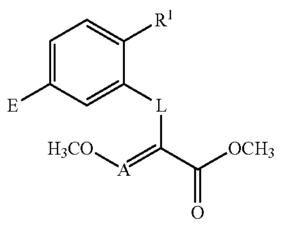

where

E represents (i) an ethynyl group substituted with a C1-C4 alkyl group, (ii) a $R^2ON—C(CH_3)—$, or (iii) a phenyl group optionally substituted with a halogen atom;

$R^1$ represents a methyl group or a chlorine atom;

$R^2$ represents a C1-C4 alkyl group optionally substituted with a substituent selected from the group consisting of a phenyl group {wherein said phenyl group is optionally substituted with a methyl group} and a cyclopropyl group;

A represents a CH or a nitrogen atom; and

L represents a $CH_2$ or an oxygen atom;

wherein when A represents a nitrogen atom, then L does not represent an oxygen atom, wherein the weight ratio of the compound represented by formula (I) to the sterol biosynthetic enzyme inhibitor is within the range of 1:0.01 to 1:100.

2. The composition for controlling a plant disease according to claim 1, wherein $R^1$ represents a methyl group;

A represents a CH;

E represents (i) a phenyl group optionally substituted with a fluorine atom or a chlorine atom, (ii) a 3,3-dimethyl-1-butyn-1-yl group, or (iii) a $R^2ON{=}C\ (CH_3)—$; and $R^2$ represents a methyl group substituted with a substituent selected from the group consisting of a phenyl group {wherein said phenyl group is optionally substituted with a methyl group} and a cyclopropyl group, or an isopropyl group in the compound represented by formula (I).

3. The composition for controlling a plant disease according to claim 1, wherein L represents a $CH_2$; and E represents a 3,3-dimethyl-1-butyn-1-yl group in the compound represented by formula (I).

4. The composition for controlling a plant disease according to claim 1, wherein the compound represented by formula (I) is methyl (2E)-2-(methoxyimino)-3-[2-methyl-5-(3,3-dimethyl-1-butyn-1-yl)phenyl]propanoate;

methyl (2E)-2-[(2-methyl-5-phenylphenyl)methyl]-3-methoxy-2-propenoate;

methyl (2Z)-2-[2-methyl-5-(2-fluorophenyl) phenoxy]-3-methoxy-2-propenoate;

methyl (2Z)-2-[2-methyl-5-(3,3-dimethyl-1-butyn-1-yl) phenoxy]-3-methoxy-2-propenoate;

methyl (2Z)-2-{2-methyl-5-[(1E)-N-isopropoxyethanimidoyl]phenoxy}-3-methoxy-2-propenoate;

methyl (2Z)-2-{2-methyl-5-[(1E)-N-(benzyloxy) ethanimidoyl]phenoxy}-3-methoxy-2-propenoate;

methyl (2Z)-2-(2-methyl-5-{(1E)-N-[(2-methylphenyl) methoxy]ethanimidoyl}phenoxy)-3-methoxy-2-propenoate;

methyl (2Z)-2-(2-methyl-5-{(1E)-N-[(3-methylphenyl) methoxy]ethanimidoyl}phenoxy)-3-methoxy-2-propenoate;

methyl (2Z)-2-(2-methyl-5-phenylphenoxy)-3-methoxy-2-propenoate;

methyl (2E)-2-{[2-methyl-5-(3-chlorophenyl)phenyl] methyl}-3-methoxy-2-propenoate;

methyl (2Z)-2-[2-methyl-5-(3-chlorophenyl) phenoxy]-3-methoxy-2-propenoate;

methyl (2E)-2-({2-methyl-5-[(1E)-N-isopropoxyethanimidoyl]phenyl}methyl)-3-methoxy-2-propenoate;

methyl (2E)-2-({2-methyl-5-[(1E)-N-(cyclopropylmethoxy) ethanimidoyl]phenyl}methyl)-3-methoxy-2-propenoate;

methyl (2E)-2-({2-methyl-5-[(1E)-N-(2-methylpropoxy) ethanimidoyl]phenyl}methyl)-3-methoxy-2-propenoate;

methyl (2E)-2-{[2-methyl-5-(2-fluorophenyl)phenyl] methyl}-3-methoxy-2-propenoate;

methyl (2Z)-2-[2-chloro-5-(2-fluorophenyl) phenoxy]-3-methoxy-2-propenoate;

methyl (2E)-2-{[2-methyl-5-(3,3-dimethyl-1-butyn-1-yl) phenyl]methyl}-3-methoxy-2-propenoate;

methyl (2Z)-2-[2-chloro-5-(3,3-dimethyl-1-butyn-1-yl) phenoxy]-3-methoxy-2-propenoate; or methyl (2Z)-2-[2-methyl-5-(4-fluorophenyl) phenoxy]-3-methoxy-2-propenoate.

5. The composition for controlling a plant disease according to claim 1, wherein the sterol biosynthetic enzyme inhibitor is prothioconazole.

6. The composition for controlling a plant disease according to claim 1, wherein the sterol biosynthetic enzyme inhibitor is mefentrifluconazole.

7. The composition for controlling a plant disease according to claim 1, wherein the weight ratio of the compound represented by formula (I) to the sterol biosynthetic enzyme inhibitor is within the range of 1:0.1 to 1:10.

8. A method for controlling a plant disease which comprises applying an effective amount of the composition for controlling a plant disease according to claim 1, to a plant or soil for cultivating a plant.

* * * * *